United States Patent [19]

Lafevers et al.

[11] 4,053,737
[45] Oct. 11, 1977

[54] MAGNETIC READER FOR BAR ENCODED CHARACTERS

[75] Inventors: James O. Lafevers; Charles T. Kao, both of Richardson, Tex.

[73] Assignee: Recognition Equipment Incorporated, Dallas, Tex.

[21] Appl. No.: 700,027

[22] Filed: June 25, 1976

[51] Int. Cl.² .......................... G06K 7/08; G06K 7/14; G06K 9/18

[52] U.S. Cl. ...................... 235/61.11 D; 235/61.11 E; 340/146.3 C; 340/146.3 Z

[58] Field of Search ................. 340/146.3 C, 146.3 Z, 340/149 A; 235/61.7 A, 61.11 E, 61.6 E, 61.6 B, 61.12 N, 61.11 D; 250/568, 569

[56] References Cited

U.S. PATENT DOCUMENTS

| | | | |
|---|---|---|---|
| 3,548,374 | 12/1970 | Vaccaro | 340/146.3 C |
| 3,638,238 | 1/1972 | Milford | 235/61.11 D |
| 3,688,955 | 9/1972 | L'Auillier | 340/146.3 Z |
| 3,879,707 | 4/1975 | Rohrer | 340/146.3 C |
| 3,890,597 | 6/1975 | Hanchett | 340/146.3 Z |

Primary Examiner—Robert M. Kilgore
Attorney, Agent, or Firm—John E. Vandigriff

[57] ABSTRACT

CMC7 characters as coded by variations in spacing between vertical bars of magnetic material are automatically read as they pass a reading electron by separately sensing all magnetic materials in each of a multiplicity of side-by-side paths spanning the height of the characters and extending the length of the field on which the characters may appear to produce a like multiplicity of analog signals. Positive excursions of the signals above a predetermined amplitude level are summed as a first time amplitude function. Negative excursions of the signals above a predetermined level are summed as a second time amplitude function. A first train of pulses is generated, one pulse for each peak in the sum of the positive excursions. A second train of pulses is generated on pulse for each peak in the sum of the negative excursions. Signals are produced from the first and the second trains representative of leading and trailing edges of bars forming the character for identification of each character in dependence upon the bar spacings.

15 Claims, 22 Drawing Figures

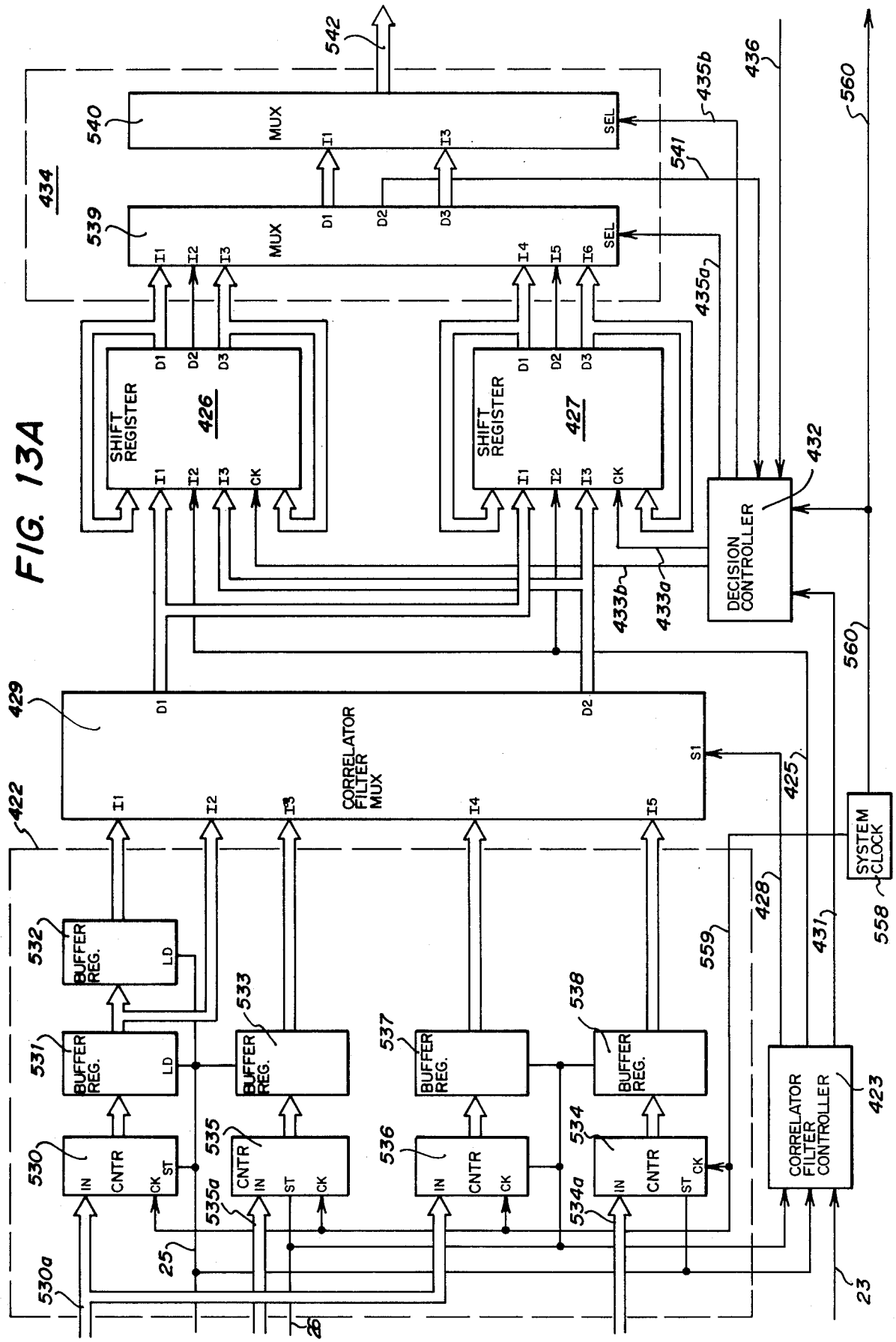

4,053,737

MAGNETIC READER FOR BAR ENCODED CHARACTERS

FIELD OF THE INVENTION

The invention relates to character recognition systems for reading characters printed in magnetic ink, and more particularly to a character recognition system for reading CMC7 bar encoded characters.

PRIOR ART

Magnetic ink character recognition (MICR) systems are widely used for sensing information recorded on documents such as checks, credit card slips, and mail pieces.

In one type of MICR reading system, a transport moves a document having alphanumeric magnetic ink characters printed thereon through a reading station. At the station, a MICR reader sensitive to the character being passed therethrough responds to the magnetized material. The response is in the form of an analog signal, the waveform of which is unique to the particular character and identifiable through comparison with known waveforms.

Human readable print fonts heretofore employed with character recognition systems have been comprised of continuous and interconnecting character strokes. The CMC7 front, however, is comprised of bar encoded characters including only spaced apart and vertical character strokes. Each of the character strokes may include one or more printed bars.

MICR character recognition systems for reading CMC7 characters have employed conventional signal gap read heads for generating an analog signal representing the first derivative of the magnetic field surrounding the character as a function of time. The waveforms are analyzed to determine the presence of the character strokes and the intervals between the strokes. One such system is disclosed in U.S. Pat. No. 3,879,707.

The reading reliability of the CMC7 character recognition systems heretofore used has been adversely affected by the occurrence of a skew between the scan track and the printed character, by data lift errors omitting leading or trailing edges of character strokes, by overprint and background inks obscuring printed bars and filling intercharacter spaces, by the occurrence of character strokes having differing magnetic field strengths, and by changes in the distance between the sensor gap and the document surface. Such systems further have been commercially infeasible because of lengthy maintenance periods required to locate the cause of system malfunctions.

The present invention provides a CMC7 reading system wherein the sensor responses are normalized and qualified to avoid erroneous edge detections, the character stroke edges are accurately detected, missing stroke edges and missing character strokes are repaired, and the character decisions are determined on the basis of both leading edge and trailing edge information to reliably identify bar encoded characters. In addition, the reading system includes an automated pattern simulator data gathering logic and ROM verification logic for rapid on site maintenance.

SUMMARY OF THE INVENTION

An automated system for reading CMC7 characters coded by variations in spacing between vertical bars of magnetic material is provided. The magnetic materials in each of a multiplicity of side-by-side paths spanning the height of the characters, and extending the length of a field on which the characters may appear are separately sensed to produce a like multiplicity of analog signals. The positive and negative excursions of the signals above a predetermined amplitude level are separately summed as time amplitude functions. A first train of pulses reflecting each peak in the sum of the positive excursions, and a second train of pulses reflecting each peak in the sum of the negative excursions are generated. Signals representative of leading and trailing edges of bars forming a character then are generated from the first and second pulse trains for identification of the character in dependence upon the spacing of the signals.

More particularly, a magnetic sensing means scans a character and forms bipolar responses indicative of the passage of leading and trailing edges of magnetic material on the document surface. Edge detecting and digitizing means detect a character stroke from leading edge and trailing edge components of the responses, and convert the same into leading edge and trailing edge digital signals. A deskew logic means operates by any oblique scanning of a character. A horizontal location logic means then senses the digital signals to detect the presence of a character. Upon receiving a character presence signal, a character recognition means analyzes the leading and trailing edge digital signals to identify the character.

DESCRIPTION OF THE DRAWINGS

For a more complete understanding of the present invention and for further objects and advantages thereof, reference may now be had to the following description taken in conjunction with the accompanying drawings in which:

FIGS. 13a and 13b are functional block diagrams of the correlator filter counter, and the error correction and decision logic unit of FIG. 10;

DESCRIPTION OF THE PREFERRED EMBODIMENT

FIGURE 1

Figures 1, 11:
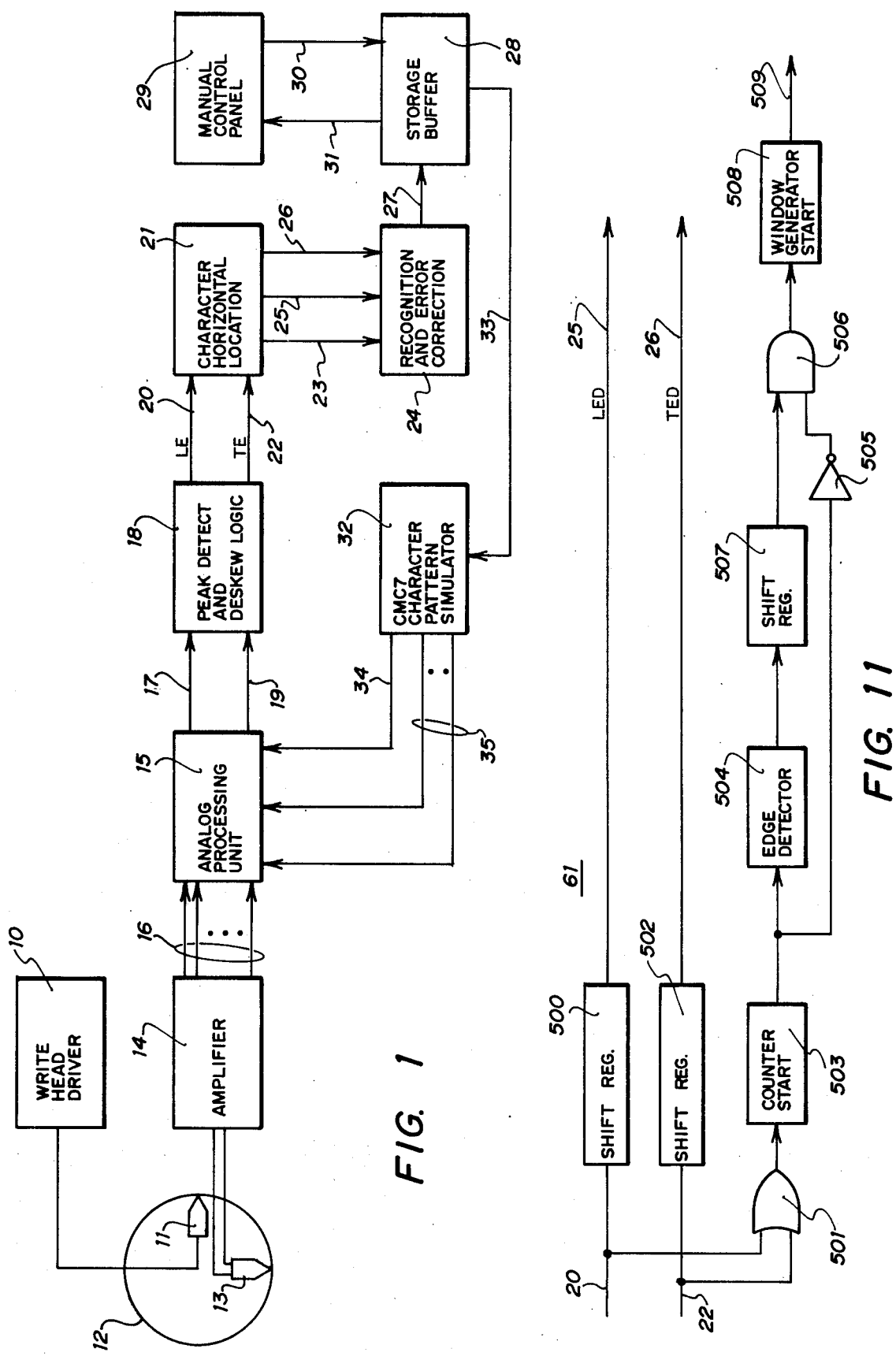
FIG. 1 is a functional block diagram of a magnetic ink character recognition system embodying the invention.
FIG. 11 is an electrical schematic diagram of the character horizontal location logic unit of FIG. 10.

FIG. 1 illustrates a CMC7 reading system embodying the invention.

A write head driver 10 DC energizes a magnetic write head 11 to DC magnetize the vertical bars of magnetic ink characters comprising a CMC7 character set. A document having the CMC7 characters printed thereon is rotated in a clockwise manner by a drum 12 which passes the document through registration with a read head 13. In the preferred embodiment described herein, the drum rotates the document past the read at a speed of 400 inches per second. The read head is a single gap magnetic reader identified as model number 141-12, which is manufactured and sold by Magnusonics Devices, Incorporated, of Hicksville, New York.

The responses of the sensor array comprising the read head 13 are amplified by a high gain amplifier unit 14 comprised of both a preamplifier and an amplifier to provide a combined amplification of the order of 800. The amplified responses of the 12 sensing elements are applied to an analog processing unit 15 by way of data channels 16.

Analog processing unit 15 half-wave rectifies the analog responses of the sensing elements to provide positive going or leading edge signals and negative going or trailing edge signals. The positive going signals are summed and normalized, and issued to a data channel 17 leading to a peak detect and deskew logic unit 18. In a like manner, the negative going signals are applied to a data channel 19 leading to unit 18.

Unit 18 detects peaks occurring in the leading and trailing edge waveforms, and removes those pulses having less than a selected pulse width. Unit 18 supplies a digital leading edge waveform to a data channel 20 leading to a character horizontal location logic unit 21, and a digital trailing edge waveform to a data channel 22 also leading to unit 21. Unit 21 delays the leading edge and trailing edge signals 300 microseconds to provide a look-ahead capability. More particularly, a character window signal defining the time period during which a valid character may appear is applied to a data channel 23 leading to a recognition and error correction unit 24. Logic unit 21 also applies the delayed leading and trailing edge signals to data channels 25 and 26, respectively, leading to unit 24.

Recognition and error correction unit 24 replaces missing edges of character segments occuring within a character window, and removes ink smear which may occur between character segments. A character decision then is made upon the resulting character image, and a character decision code is applied to a data channel 27 leading to a storage buffer 28. The location of the character decision code in buffer 28 may be addressed by a manual control panel 29 by way of a control channel 30. The character code then may be provided on a data channel 31 for visual display on panel 29.

In order to isolate the cause of read errors in the reading system, a CMC7 character pattern simulator 32 is activated by manually selecting a location in buffer 28 at control panel 29. A command code then is provided at a buffer output connected by way of a control channel 33 to the enable input of CMC7 character pattern simulator 32. In response, a select command is supplied by unit 32 to a control line 34 leading to analog processing unit 15. The analog processing unit then is selected from the amplifier unit 14 output to the unit 32 output on data channels 35. The pattern simulator unit 32 generates character pattern waveforms on data channels 35 which have known correctable and uncorrectable errors therein for testing the reading system. The character recognition decision generated during the testing period is monitored by the manual control panel 29 to locate problems in the reading system.

FIG. 2

Figure 2:
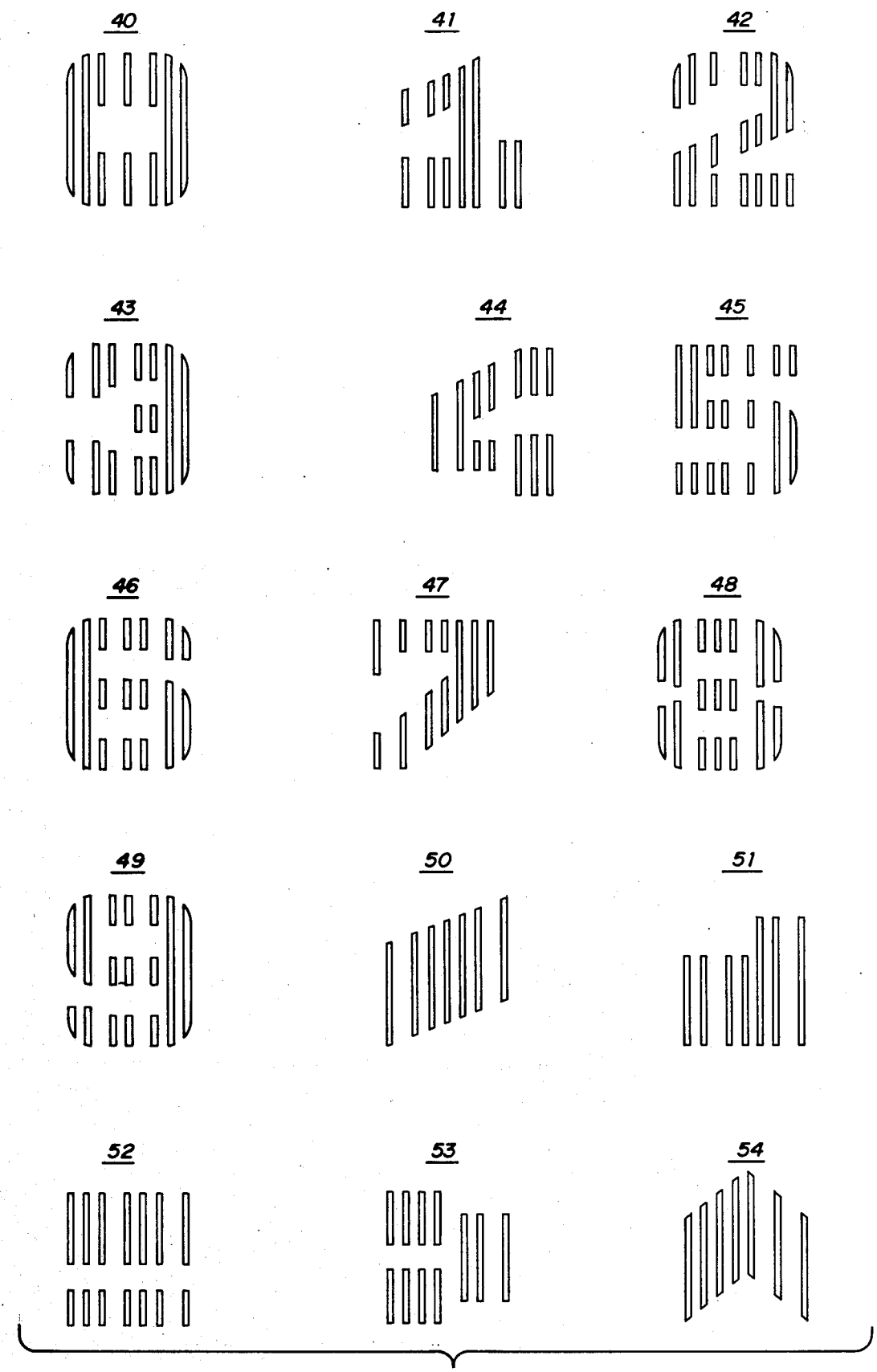
FIG. 2 is a diagrammatic illustration of special and numeric CMC7 characters.

FIG. 2 illustrates the character font designated as CMC7, which comprises character formed with seven vertical bars or character strokes. The spacings between the vertical bars are of varying width to form a code for recognizing a character. The size or number of segments comprising a vertical bar of a CMC7 character are not determinative in identifying the character.

Referring to FIG. 2, CMC7 numerics 0-9 are referred to to by reference numbers 40-49, respectively. Special CMC7 characters 50-54 are provided for preventive maintenance methods to be described below.

FIG. 3

Figure 3:
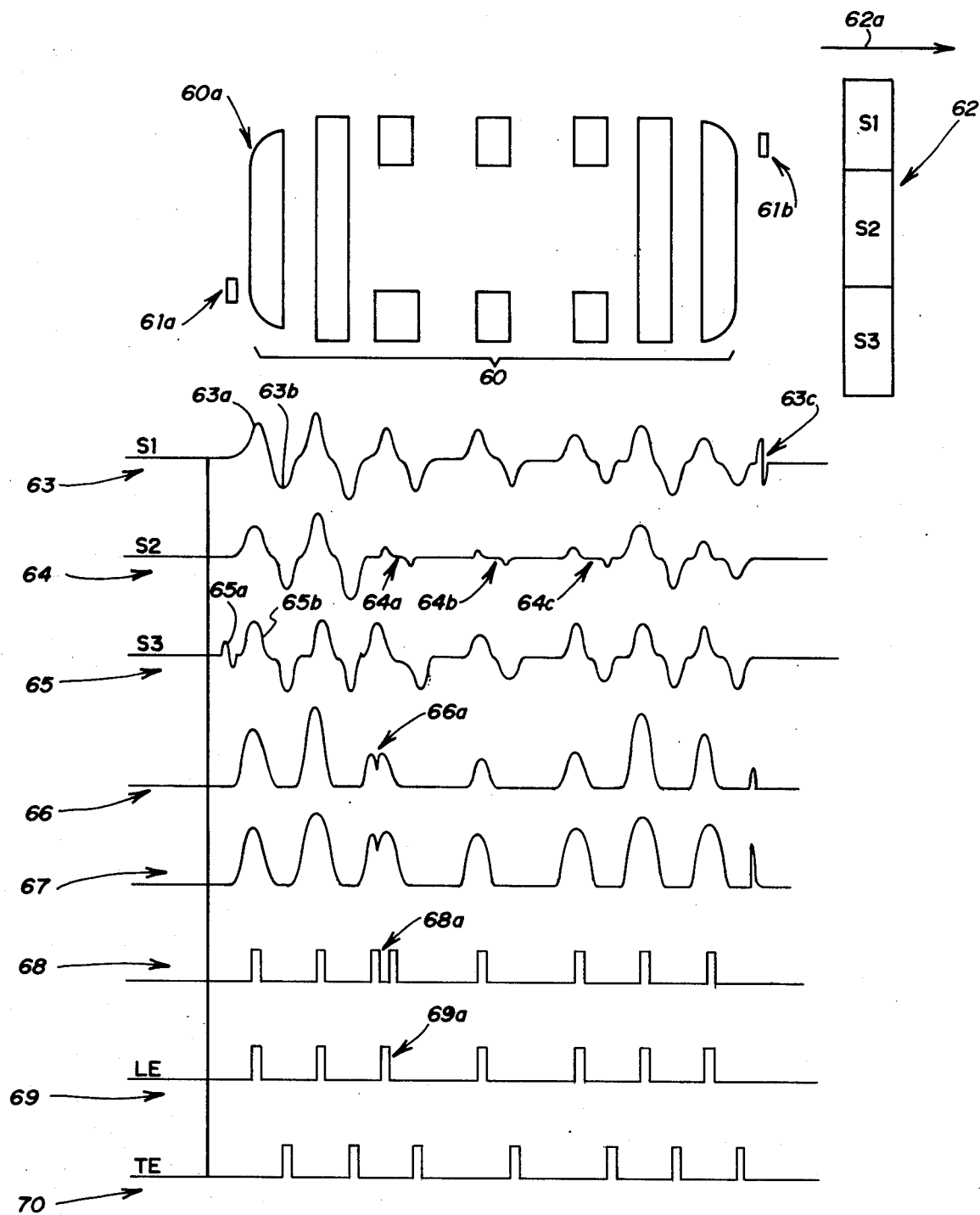
FIG. 3 illustrates the relative positions of three sensors with respect to a CMC7 character, and output waveforms generated as the sensors scan the character.

FIG. 3 illustrates the analog responses of three magnetic sensing elements comprising read head 13 on scanning a numeric zero printed in a CMC7 font, and the intermediate waveforms derived from the analog responses in arriving at a character decision.

By way of example, a CMC7 pattern 60 is imprinted on a document surface with magnetic ink. Adjacent to the pattern are ink splatters 61a and 61b. A sensor array 62 comprised of magnetic sensing elements S1, S2 and S3 is passed horizontally across the pattern 60, and ink splatters 61a and 61b in the direction indicated by arrow 62a.

The analog response of sensing element S1 is illustrated by waveform 63, wherein signal peak 63a corresponds to the sensing of a leading edge of a bar or character segment 60a of numeric 0. The trailing edge of bar 60a is reflected by peak 63b. The leading and trailing edges of the remaining vertical bars of pattern 60 are similarly indicated. The response of sensing element S2 is illustrated by waveform 64 wherein the positive cross-talk gain of the array 62 is illustrated by curved portions of 64a, 64b and 64c. The response of sensing element S3 is illustrated by a waveform 65 wherein the ink splatter 61a is reflected by the curved portion 65a. Further, the leading edge of character stroke 60a is reflected by the waveform peak 65b.

When the analog responses of sensing elements S1, S2 and S3 are summed, half-wave rectified and noise biased by analog processing unit 15, a waveform 66 is formed for the leading edge responses. The effect of scanning segmented character strokes having segments of different widths, or scanning a segment character stroke along a track skewed with respect to the stroke is illustrated by wave portion 66a of waveform 66.

When waveform 66 is normalized by a logarithmic amplifier of processing unit 15, waveform 67 occurs. Upon applying waveform 67 to a peak detector and a pulse width discriminator comprising peak detect and deskew logic unit 18, the waveform 68 is formed. As may be seen by inspection of waveforms 65-68, the effects of wave portion 65a may be eliminated by applying a noise bias. The effects of wave portion 63c reflecting ink splatter 61b, however, is not eliminated until a pulse width discrimination occurs as illustrated by waveform 68.

One aspect of the invention described herein is illustrated by a waveform 69, where the double peak 66a of waveform 66 has been replaced by a pulse 69a generated by deskew logic unit 18. The deskew logic averages the positions of the two pulses 68a of waveform 68, and forms therefrom the pulse 69a which is positioned at the average location of the double peak 68a. Prior systems have eliminated one or the other of the two peaks to form a single peak. The deskew logic, however, forms an average peak to provide a more accurate placement of the segment stroke.

Waveform 70 illustrates the trailing edge waveform generated upon processing the trailing edge analog responses in the same manner as described for the leading edge responses.

In the embodiment described herein, a logic 0 is indicated by a character segment interval approximately 24 to 36 microseconds in width. A logic 1 is indicated by a character segment interval approximately 44 to 56 microseconds in width. Waveforms 69 and 70 indicate a logic field code 001100 which identifies the CMC7 numeric zero.

FIG. 4

Figure 4:
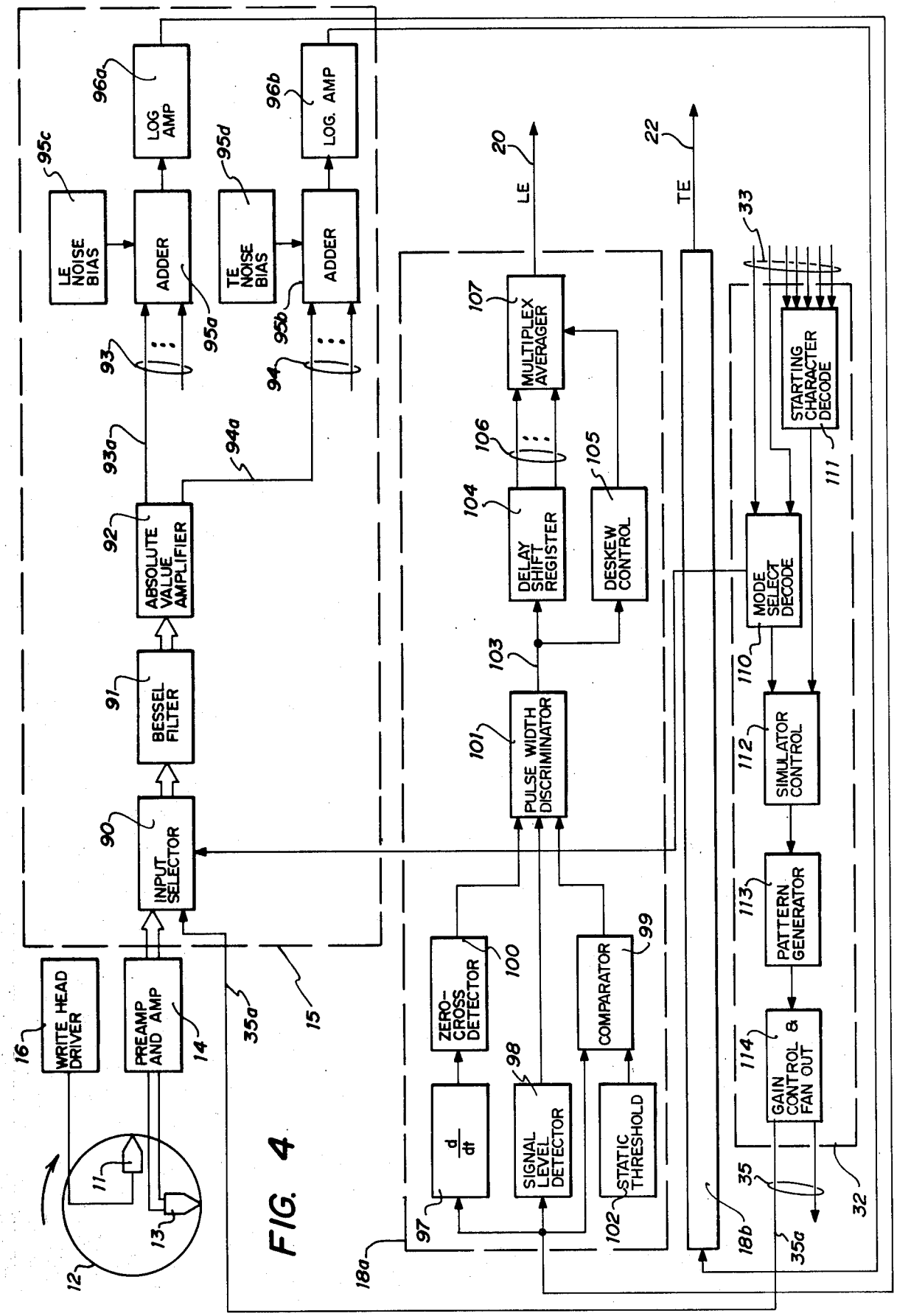
FIG. 4 is a detailed functional block diagram of the analog processing unit, the peak detect and deskew logic unit, and the pattern simulation unit of FIG. 1.

FIG. 4 is a detailed functional block diagram of the data lift section of the reading system of FIG. 1, which includes driver 10, write head 11, read head 13, amplifier unit 14, analog processing unit 15, peak detect and deskew logic unit 18, and pattern simulation unit 32.

In considering FIG. 4, it should be kept in mind that the read head 13 has twelve segments in a linear array so that the preamplifier 14, input selector 90, Bessel filter 91 and absolute value amplifier 92 actually comprise twelve channels in parallel.

One of twelve channel output of amplifier unit 14 is applied by way of a data channel outputs of amplifier unit 14 is applied by way of a data channel 16a to an input select unit 90, which selects either channel 16a or channel 35a leading from the pattern simulator unit 32. The output of select unit 90 is applied to a Bessel filter 91 having a 3db output at 40 KHz. The filtered signal is applied to an absolute value amplifier 92 which issues a leading edge signal on a data channel 93a of data channels 93, and a trailing edge signal on a data channel 94a of data channels 94. Data channel 93a is connected to one of twelve inputs of an adder unit 95a receiving by way of channels 93 the leading edge signals generated from the twelve output data channels of amplifier unit 14. In addition, adder unit 95a receives a leading edge noise bias from a noise bias unit 96a to remove low level noise. The output of adder 95a is applied to a logarithmic amplifier 96a providing a six to one compression.

The normalized sum then is supplied to a differentiator 97, a level detector 98 and to one input of comparator 99.

Input select unit 90, filter 91, amplifier 92, bias units 96a and 96b, adders 95a and 95b, and logarithmic amplifiers 96a and 96b comprise analog processor 15 of FIG. 1.

The output of the differenntiator 97 is applied to a zero-cross detector 100, which indicates the occurrence of a data peak to a pulse-width discriminator 101. Signal level detector 98 senses an incoming leading edge signal to select one of three reference pulse widths for the pulse-width discriminator 101. More particularly, detector 98 issues a two-bit code to discriminator 102 which is indicative of the amplitude of the signal. An amplitude less than or equal to 0.78 volts but greater than 0.0 volts is indicated by a logic 00 code, and an amplitude greater than 0.78 bolts but less than or equal to 2.0 volts is indicated by a logic 01 code. An amplitude above 2.0 volts is indicated by a logic 10 code.

Comparator 99 receives a reference voltage input from a static threshold unit 102. In the preferred embodiment described herein, such voltage is of the order of 200 millivolts. The output of comparator 99 signals the occurrence of a positive going waveform excursion to discriminator 101.

Pulse width discriminator 101 measures the time period between an output of comparator 99 and a subsequent peak indication of detector 100, and compares such time period with the pulse width selected by level detector 98. A two, three or four microsecond pulse width is selected if the logic code issued by detector 98 is 00, 01 or 10, respectively. If the time period is smaller than the selected pulse width, the leading edge signal is ignored. If the time period is greater than the selected pulse width, however, a leading edge pulse is applied by way of a data channel 103 to a delay shift register 104 and to a deskew control logic unit 105.

Delay shift register 104 provides a 22 to 32 microsecond delay to the leading edge pulse on channel 103. Deskew control logic unit 105 detects the occurrence of double pulses on data channel 103, and selects by way of a control line 108 one of the delay lines 106 corresponding to the double pulses. The delayed leading edge pulse is applied along the selected one of delay lines 106 to a multiplexer averager 107, which issues a pulse having the average delay to data channel 20 leading to the character horizontal location logic unit 21 of FIG. 1.

Differentiator 97, detectors 100 and 98, static threshold unit 102, comparator 99, discriminator 101, shift register 104, deskew control unit 105 and multiplexer averager 107 comprise leading edge logic unit 18a of peak detect and deskew logic unit 18.

Data channel 94a is connected to one of twelve inputs of an adder unit 95b receiving by way of channels 94 the trailing edge signals generated from the twelve output data channels of amplifier unit 14. A trailing edge noise bias unit 95d supplies a voltage bias to raise the information signal base line above low level noise. The output of adder 95b is applied to a logarithmic amplifier 96b providing a six to one compression. The normalized sum of trailing edge signals is applied to a trailing edge logic unit 18b of peak detect and deskew logic unit 18. Logic unit 18b is a duplication of logic unit 18a for the processing of trailing edge signals. Logic units 18a and 18b comprise peak detect and deskew logic unit 18 of FIG. 1. The output of logic unit 18b is a trailing edge pulse which is applied to data channel 22 leading to a second input of character horizontal location logic unit 21 of FIG. 1.

A seven bit code is provided at the output of storage buffer 28 of FIG. 1, and applied along channels 33 of FIG. 4, to a mode select decode unit 110 and to a starting character decode unit 111. More particularly, the bit zero and bit one lines from buffer 28 are applied to decode unit 110, and the bit two through bit six lines are applied to the decode unit 111. Upon detecting a logic 00 code, the unit 110 issues a command signal on control line 34 to select the input selector unit 90 to data channel 16a and thereby read information printed on a document being transported by drum 12. Otherwise, input selector unit 90 is selected to the simulated input provided on data channel 35 to test the reliability of the reading system. If a logic 01 code is detected by decode unit 110, a further command signal is issued to a simulator control unit 112 to provide a single is CMC7 character pattern repeatedly. If a logic 10 code is detected, however, simulator control unit 112, is directed to provide a repeating series of character patterns.

Decode unit 111 selects the starting character pattern to be addressed by simulator control unit 112. The character patterns then are addressed beginning with the starting character and proceeding through to the end of the character pattern series. The character patterns then are repeated beginning again with the starting character to the end of the character series. Those character patterns preceding the starting character are not addressed.

Simulator control unit 112 in response to decode unit 110 and decode unit 111 controls the operation of a pattern generator 113. The character patterns addressed by simulator control unit 112 are supplied by generator 113 to a gain control and fan-out unit 114. Unit 114 applies a manually set gain to each of 12 data channels 35, and provides a character pattern generated by unit 113 to each of the data channels comprising channel 35.

Input selector 90, adders 95a and 95b, noise bias units 96a and 96b, level detector 98 and static threshold unit 102 are well known in the logic design and implementation arts, and are not further discussed. Bessel filter 91, absolute value amplifier 92, logarithmic amplifiers 96a and 96b, and comparator 99 are of textbook nature. Graeme, *Operational Amplifiers: Design and Applications* (1971), provides technical descriptions relevant to the Bessel filter 91 at pages 282–321. In addition, a technical description of logarithmic amplifiers 96a and 96b is provided on pages 258–268, a description of comparator 99 is provided at page 362, and a description of differentiator 97 and zero-cross detector 100 appears at pages 218 ∝ 219, 569. Ghausi, *Principles and Design of Linear Active Circuits* (1965), provides technical descriptions relevant to Bessel filter at pages 86–90. Further, Graeme, *Applications of Operational Amplifiers-Third Generation Techniques* (1973), provides technical descriptions of the absolute value amplifier 92 at pages 119–132, and of absolute amplifiers 96a and 96b at pages 94–97. Still further, Millman and Taub, *Pulse, Digital and Switching Waveforms* (1965), presents technical descriptions of noise bias units 96a and 96b at pages 226–228. Millman and Halkias, *Integrated Electronics* (1972), provides technical information relevant to logarithmic amplifiers 96a and 96b at pages 574–575 and 539. Technical descriptions directed to differentiator 97 and zero-cross detector 100 appear at pages 546 and 569.

FIG. 5

Figure 5:
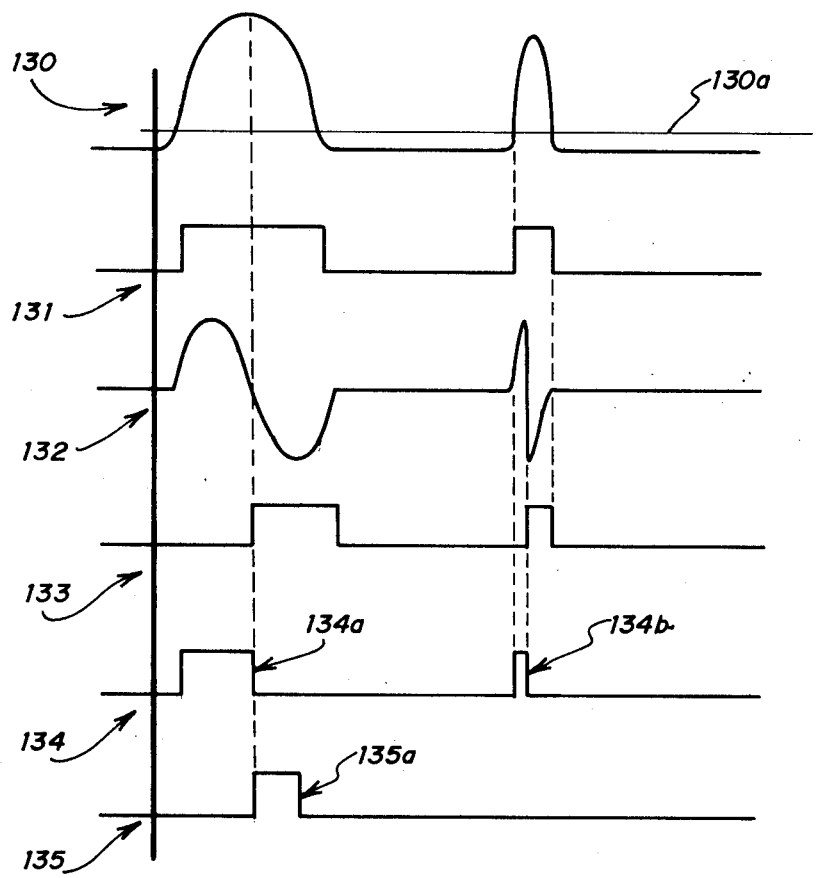
FIG. 5 is a timing and output waveform diagram of the operation of the pulse width discriminator of FIG. 4.

FIG. 5 is a timing and waveform diagram illustrating the operation of pulse-width discriminator 101 of FIG. 4.

Waveform 130 illustrates a normalized leading edge signal applied to the inputs of differentiator 97, detector 98 and comparator 99. Superimposed upon waveform 130 is a static threshold level 130a supplied by static threshold unit 102 to comparator 99.

Upon receiving the waveform 130, level detector 98 sensed the amplitude of the positive going signals of the waveform and issues a pulse width code as before described. If a pulse of waveform 134 is of a width equal to or greater than the pulse width indicated by the code, pulse width discriminator 101 issues a pulse on channel 103.

Waveform 135 illustrates the output of pulse width discriminator 101 which is applied to data channel 103. More particularly, a pulse 134a of waveform 134 is reflected by a pulse 135a of waveform 135. Pulse 134b of waveform 134, however, does not exceed or equal the selected pulse width and is ignored.

FIG. 6

Figure 6:
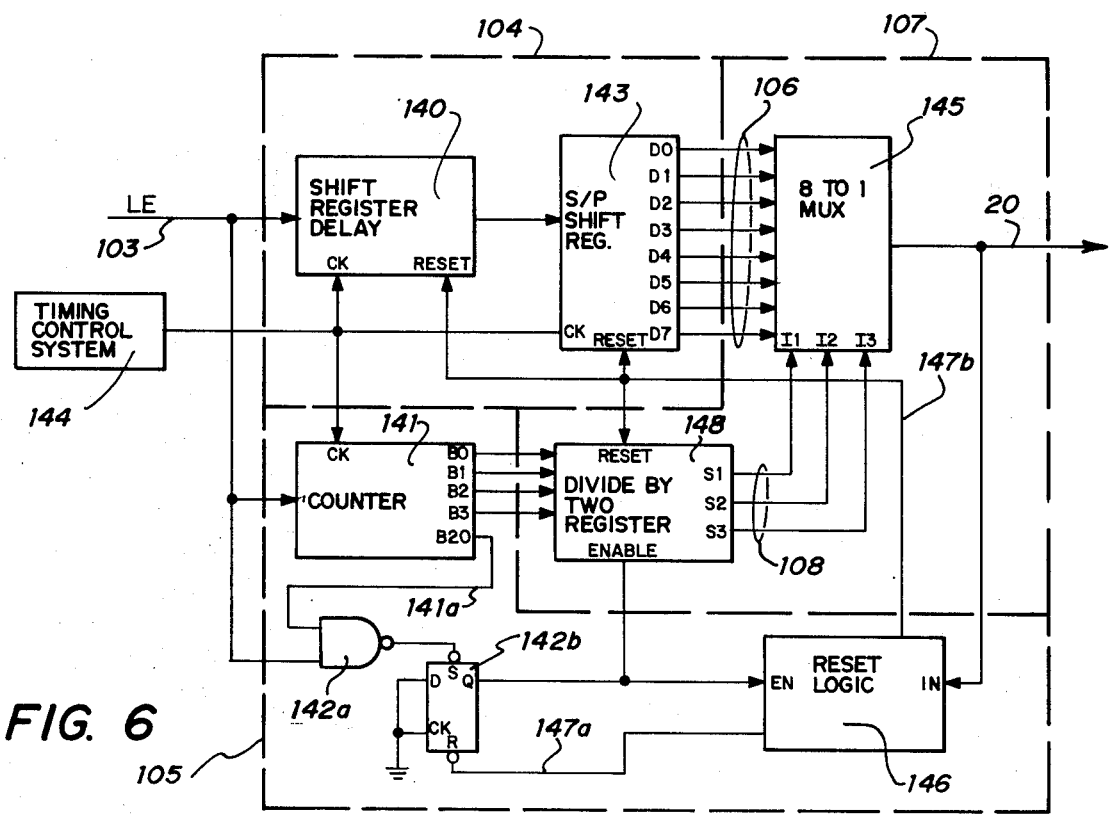
FIG. 6 is a functional block diagram of the leading edge deskew logic of FIG. 6.

FIG. 6 is a detailed functional block diagram of the leading edge deskew logic comprised of units 104, 105 and 107 of FIG. 4. The deskew logic for the trailing edge signals is identical to that for the leading edge signals, and will not further be discussed.

Referring to FIG. 6, data channel 103 is connected to the input of a shift register delay unit 140, to the input of a 20 microsecond counter 141, and to the input of a NAND gate 142a. The output of delay unit 140 is applied to the input of a serial-to-parallel shift register 143 having eight outputs DO-D7. The clock input to shift register 143 is connected to the output of timing control system 144 which supplies a two microsecond clock, and to the clock inputs of delay unit 140 and counter 141. The eight outputs of shift register 143 are connected to corresponding inputs of an eight-to-one multiplexer 145. The output of multiplexer 145 is connected to data channel 60 and to the input of a reset logic unit 146.

One output of logic unit 146 is connected to a control line 147a leading to the reset input of a flip-flop 142b. A second output of logic unit 146 is connected by way of a control line 147b to the reset input of a divide-by-two register 148, and to the reset inputs of shift register 143 and delay unit 140. The enable input to logic unit 146 is connected to the enable input of register 148 and to the Q output of flip-flop 142b. The set input to flip-flop 142b is connected to the output of NAND gate 142a. The D and clock (CK) inputs to flip-flop 142b each are connected to ground.

The BO-B3 output of counter 141 are connected to corresponding inputs of register 148. The C20 output of counter 141 is connected to a second input of NAND gate 142a. The select outputs S1-S3 of register 148 are connected to the select inputs I1-I3 of multiplexer 145.

Delay unit 140 and register 143 comprise delay shift register 104 of FIG. 4, and multiplexer 145 and register 148 comprise multiplex averager 107. NAND gate 142a, flip-flop 142b and reset logic unit 146 comprise deskew control unit 105.

In operation, a leading edge signal on data channel 103 is applied to shift register delay unit 140, to the twenty microsecond counter 141 and to NAND gate 142a. The leading edge signal on data channel 103 is delayed by 20 microseconds at the output of delay unit 140. Serial-to-parallel shift register 143 further delays the signal in 2 microsecond steps as controlled by timing control system 144. The eight delayed signals formed from the leading edge signal are applied in parallel along data channels 106 to the corresponding inputs of multiplexer 145.

Counter 141 is enabled by a positive going pulse appearing on channel 103, and counts at the two microsecond clock rate. During a 20 microsecond count, the C20 output of counter 141 remains high. Upon the occurrence of a second positive going pulse during the 20 microsecond count, the output of NAND gate 142a transitions to a logic zero to set flip-flop 142a. The output of the flip-flop transitions to a logic one state, thereby enabling register 148 and logic unit 146. The four bit output of counter 141 then is loaded into register 148, the output of which is applied to the select inputs I1-I3 of multiplexer 145 to select one of the outputs of register 143. When a selected one of delay lines 106 is supplied to data channel 60, the delayed signal also is applied to reset logic unit 146. Unit 146 thereupon applied a logic zero state to line 147a to reset flip-flop 142b, and a logic one state to line 147b to reset unit 140, register 143 and register 148.

Upon the occurrence of a 20 microsecond count, the B20 output of counter 141 transitions to a logic zero to disable the set input to flip-flop 142b.

The system of FIG. 6 thus corrects double pulse conditions occurring in a leading edge signal on channel 103. A pulse appearing on channel 103 is delayed 20 microseconds at delay unit 140 to provide a look ahead time period. Any such pulse which is spaced at least 20 microseconds from a preceding pulse will enable counter 141. If no other pulse appears on channel 103 during a 20 microsecond count period, multiplexer 145 is selected to the D0 output of register 143. If a second pulse appears during the 20 microsecond count period, however, flip-flop 142b is set at the leading edge of the second pulse. Counter 141 outputs B0-B3 then are loaded into register 148. The least significant bit output B0 is dropped to effect a division by two, and the resulting output of register 148 selects multiplexer 145 to one of the register 143 outputs D0-D7 as shown in TABLE I.

TABLE I

| Delay Between Double Pulses USED | B3 | B2 | B1 | Register Output Selected | Output Pulse Delay USEC |
|---|---|---|---|---|---|
| 0 | 0 | 0 | 0 | D0 | 22 |
| 2 | 0 | 0 | 0 | D0 | 22 |
| 4 | 0 | 0 | 1 | D1 | 24 |
| 6 | 0 | 0 | 1 | D1 | 24 |
| 8 | 0 | 1 | 0 | D2 | 26 |
| 10 | 0 | 1 | 0 | D2 | 26 |
| 12 | 0 | 1 | 1 | D3 | 28 |
| 14 | 0 | 1 | 1 | D3 | 28 |
| 16 | 1 | 0 | 0 | D4 | 30 |
| 18 | 1 | 0 | 0 | D4 | 30 |
| 20 | 1 | 0 | 1 | D5 | 32 |
| 20 | Not Used | | | D0 | 22 |

Referring to TABLE I it may be understood that where no double pulse condition occurs, the pulses on channel 103 are delayed 22 microseconds before continuing along channel 60. If a double pulse condition occurs, however, the first of the double pulses shall be delayed 22 microseconds plus an additional delay approximately equal to a half of the separation between the double pulses.

FIG. 7

Figure 7:
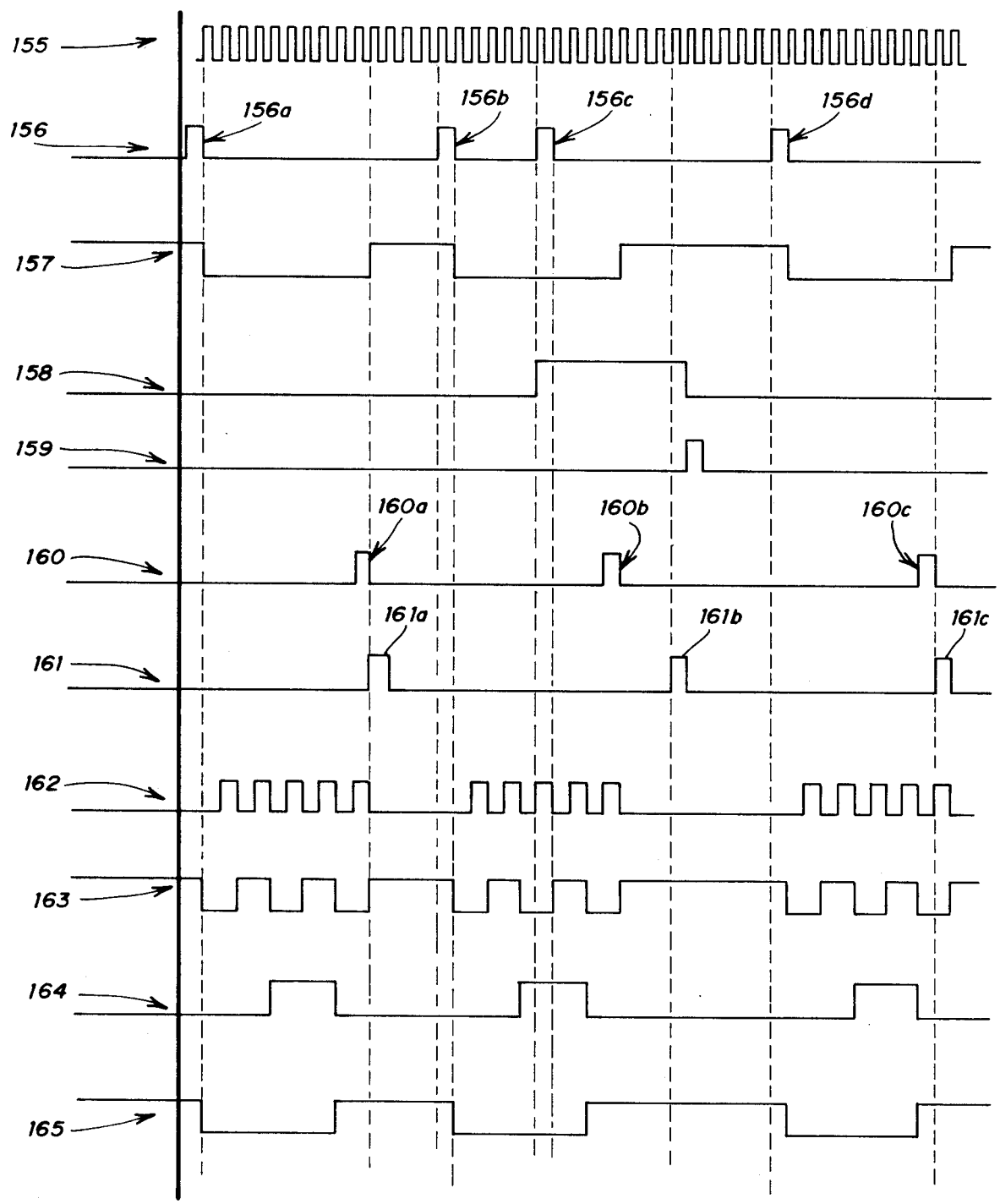
FIG. 7 is a timing and output waveform diagram of the leading edge deskew logic of FIG. 6.

FIG. 7 is a timing and output waveform diagram of the operation of the system of FIG. 6.

Waveform 155 is an illustration of a 500 KHZ clock signal supplied by timing control system 144. Waveform 156 illustrates a leading edge signal on data channel 103, wherein a pulse 156a and a pulse 156b appear 30 microseconds apart. A third pulse 156c is delayed from pulse 156b by 12 microseconds. Pulses 156b and 156c, therefore, from a double pulse condition as before described. Pulse 156d is delayed from pulse 156c by 26 microseconds. Since the pulse 156c occurs less than 20 microseconds after pulse 156b, the counter 141 is not restarted by pulse 156c.

Waveform 157 illustrates a counter signal on line 141a which is generated in response to the input waveform 156. As may be seen from an inspection of waveform 157, the counter 141 is enabled by the trailing edge of pulses 156a and 156b. When the counter has been enabled, a second pulse such as pulse 156c occurring within a 20 microsecond counter period is ignored.

Waveform 158 illustrates the Q output of flip-flop 142b which is set at the leading edge of pulse 156c. Waveform 159 illustrates the output of reset logic unit 146 appearing on control lines 147a and 147b. The output of shift register delay unit 140 is illustrated by waveform 160, wherein the pulses 160a, 160b and 160c are delayed from pulses 156a, 156b and 156d, respectively, but 20 microseconds. Since the delay unit 140 is reset during the period of occurrence of pulse 156c, there is no pulse of waveform 160 related to pulse 156c. Waveform 161 illustrates the output of multiplexer 145 wherein a pulse 161a is delayed from pulse 156a by 22 microseconds. Pulse 161b, however, is delayed from pulse 156b by 28 microseconds to correct for a double pulse condition. Pulse 161c is delayed from pulse 156d by 22 microseconds.

Waveforms 162-165 illustrate the B0-B3 outputs, respectively, of counter 141.

FIG. 8

Figure 8A:
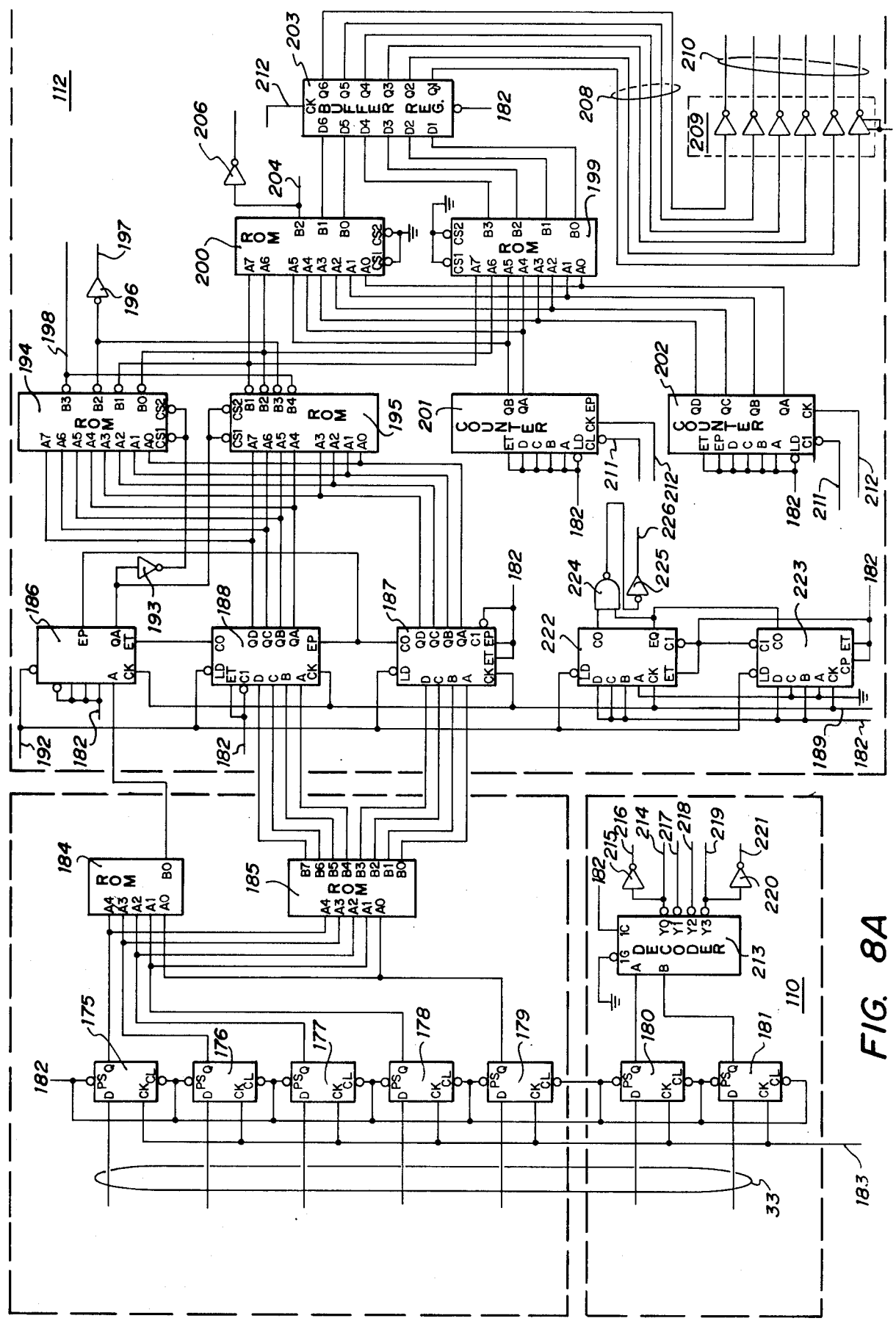
FIGS. 8a-8d are electrical schematic diagrams of the character pattern simulator of FIG. 1.

FIG. 8a is an electrical schematic diagram of the pattern simulation unit 32 of FIG. 4.

Figure 8B:
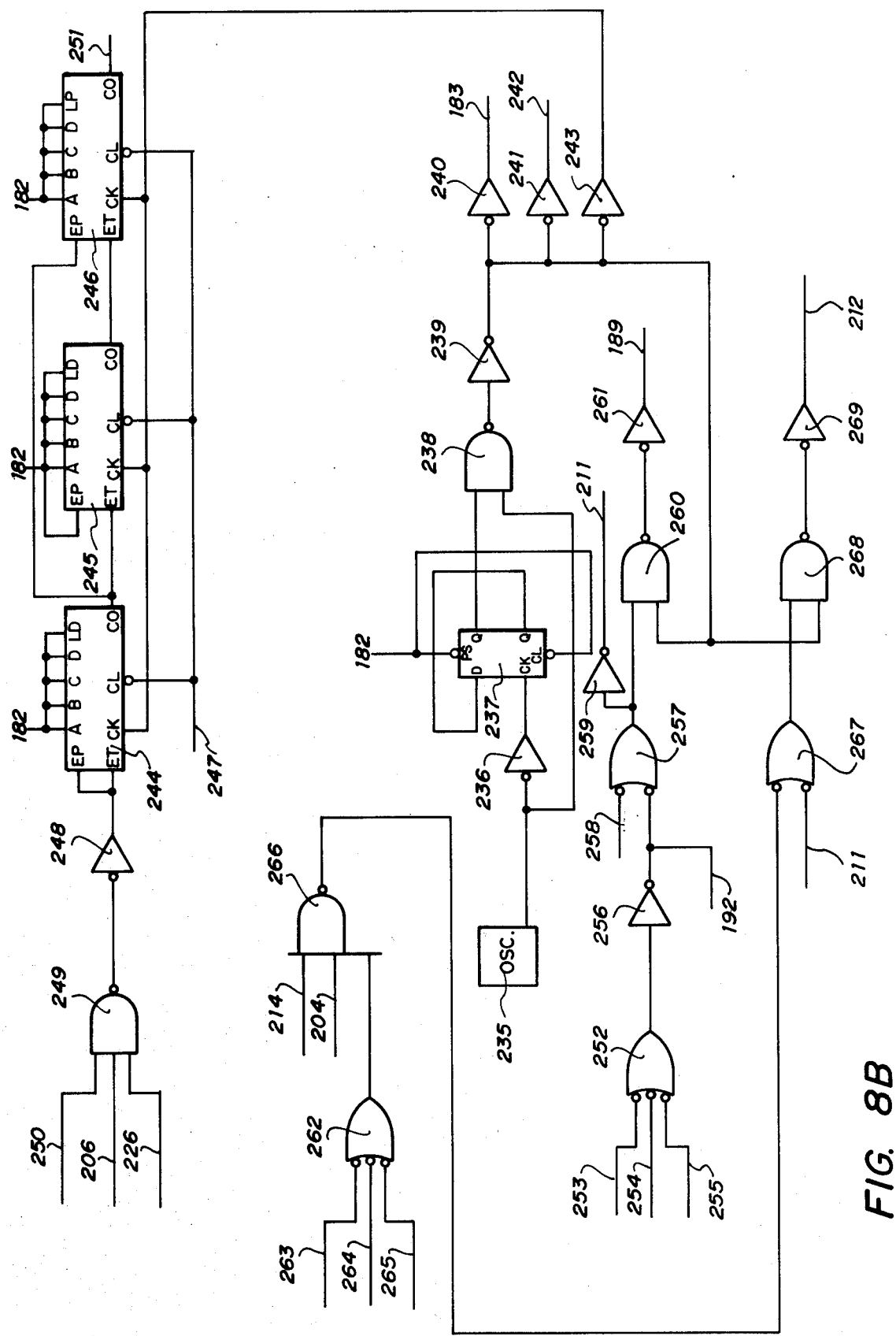

Control lines 33 of FIG. 4 leading from manual control panel 29 are connected to the D inputs of flip-flops 175-179 of starting character decode unit 111, and to the D inputs of flip-flops 180 and 181 of mode select decode 110. The preset and clear inputs of each of the flip-flops are disabled by a +5 volt source 182. The clock inputs to flip-flops 175-181 are connected to a control line 183 leading to the 4 MHz oscillator 235 (FIG. 8B). The Q outputs of flip-flops 175-179 are applied to the A4-A0 inputs, respectively, of ROMs 184 and 185. ROMs 184 and 185 are 32 × 8 bit ROMs having a five bit addressable input and an eight bit output. The B0 output of ROM is applied to the A input of a four bit address counter 186. The B0 outputs of ROM 185 are applied to the A-D inputs, respectively, of a four bit address counter 187, and the B4-B7 outputs of ROM 185 are applied to the A-D inputs, respectively, of a four bit address counter 188. Flip-flops 175-179, and ROMs 184 and 185 comprise starting character decoder 111 of FIG. 4.

The clock inputs of counters 186-187 are connected to the clock inputs of four bit address counters 222 and 223, and to a control line 189. The load inputs of counters 186–188, 190 and 191 are connected to a control line 192. The ET enable input of counter 186 is connected to the carry-over output (CO) of counter 188. The EP enable output of counter 186 is connected to the EP enable input of counter 188, and to the carry-over input of counter 187. The B–D and clear inputs of counter 186 are connected to +5 volt source 182, and the QA output of the counter is applied through an inverter 193 to the enable inputs (CS1, CS2) of a ROM 194. The QA output also is connected to the enable inputs (CS1, CS2) of a ROM 195.

The ET enable and clear inputs of counter 188 are each connected to +5 volt source 182. The QA–QD outputs of counter 188 are connected to the A4–A7 inputs, respectively, of ROMs 194 and 195.

The ET and EP enable inputs of counter 187 are connected to the clear input and to voltage source 182. The QA–QD outputs of counter 187 are connected to the A0–A3 inputs, respectively, of ROMs 194 and 195. Counters 186–188 are connected in cascade to form a nine bit counter. ROMs 194 and 195 are each 256 by 4 bit ROMs having eight bit addressable inputs and four bit outputs. ROMs 194 and 195 have stored therein character patterns which are addressable by the combined eight bit output of counters 187 and 188.

The B2 output of ROM 194 is connected to the B4 output of ROM 195, and through an inverter 196 to a control line 197. The B3 output of ROM 194 is connected to the B4 output of ROM 195 and to a data line 198. The B1 output of ROM 194 is connected to the B1 output of ROM 195, and to the A7 inputs of ROMs 199 and 200. The B2 output of ROM 194 is connected to the B0 output of ROM 195, and to the A6 inputs of ROMs 199 and 200.

The A4 and A5 inputs of ROMs 199 and 200 are connected to the QA and QB outputs, respectively, of a four bit counter 201. The A0–A3 inputs of ROMs 199 and 200 are connected to the QA–QD outputs, respectively, of a four bit counter 202. The enable inputs (CS1, CS2) of ROMs 199 and 200 are connected to ground.

The B0 output of ROM 200 is connected to the D5 input of a buffer register 203, and the B1 output of ROM 200 is connected to the D6 input of register 203. The B2 output of ROM 200 is connected to a control line 204, and connected through an inverter 205 to a control line 206. The enable inputs of ROM 200 are connected to ground, as are the enable inputs of ROM 199. The B0–B3 outputs of ROM 199 are connected to the D1–D4 inputs, respectively, of buffer register 203.

The clear input to register 203 is connected to +5 volt source 182, and the clock input to the register is connected to a control line 212. The Q1–Q6 outputs of buffer register 203 are connected to data lines 208 which are applied through a line driver array 209 to data lines 210.

The load, A–D and ET enable inputs of counter 201 are each connected to voltage source 182. The clear input to counter 201 is connected to a control line 211. The EP enable input of counter 201 is connected to the carry-over output of counter 202. The load, A–D, EP enable and ET enable inputs of counter 202 are each connected to voltage source 182. The clear input of counter 202 is connected to control line 211 and the clock input is connected to control line 212.

Counters 186–188, 201, 101, 222, and 223, ROMs 194, 195, 199 and 200, register 203 and driver array 209 comprise a part of simulator control unit 112. The remainder of unit 112 is disclosed in the descriptions of FIGS. 8b and 8c.

The Q outputs of flip-flops 180 and 181 are connected to the A and B inputs of a decoder 213. The ground input of decoder 213 is connected to ground, and the enable input (1C) is connected to +5 voltage source 182. The Y0 output of decoder 213 is applied to a control line 214 and through an inverter 215 to a control line 216. The Y1 output of decoder 213 is connected to a control line 217, and the Y2 output is connected to a control line 218. The Y3 output of decoder 213 is connected to a control line 219, and through an inverter 220 to a control line 221. Flip-flops 180 and 181, and decoder 213 comprise mode select decoder 110 of FIG. 4.

The A input of a four bit counter 222, and the A and C inputs of a four bit counter 223 are connected to ground. The B–D inputs of counter 222, and the B and D inputs of counter 223 are connected to voltage source 182. The ET enable and clear inputs of counter 222 are connected to the clear, EP enable and ET enable inputs of counter 223 and to voltage source 182. The load inputs of counters 222 and 223 are connected to control line 192, and the clock inputs of the counters are connected to control line 189. The carry-over output of counter 222 is connected to one input of a NAND gate 224, the output of which is connected through an inverter 225 to a control line 226. The EQ enable output of counter 222 is connected to a second input of NAND gate 224 and to the carryover output of counter 223.

In operation, the system of FIG. 8a receives a binary starting character code from manual control panel 29 at the D inputs of flip-flops 175–179. The flip-flops in turn address ROMs 184 and 185 which have stored therein the starting addresses for the nine bit character pattern address counter comprised of counters 186–188. The pattern address counter is loaded with the output of ROMs 184 and 185, and addresses ROMs 194 and 195 having stored therein the leading edge, trailing edge, and character segment space codes forming a character pattern. The output of ROMs 194 and 195, and the outputs of counters 201 and 202 address the ROMs 199 and 200. ROMs 199 and 200 have stored therein the shapes of the waveforms to be used in the diagnostic testing of the reading system. Inputs A6 and A7 of ROM 200 are coded inputs indicating a leading edge, a trailing edge, a dropping edge or an intracharacter space. More particularly, a leading edge is indicated by a logic 00 code and a trailing edge is indicated by a logic 01 code. A dropping edge, the time position at which a waveform ceases to continue beyond the trailing edge of a positive going pulse, is indicated by a logic 10 code. An intracharacter space, the space between vertical character strokes, is indicated by a logic 11 code. The remaining inputs of ROM 200 and the inputs of ROM 199 comprise a running clock which traces out the indicated waveform. The waveform output by ROMs 199 and 200 is stored in buffer register 203.

The flip-flops 180 and 181 respond to control panel 29 signals at the D inputs to apply a code to the A and B inputs of of decoder 213. The decoder 213 indicates the mode of operation of the pattern simulation unit 32. A logic zero state at the Y0 output of the decoder indicates that a mode zero shall be entered during which input selector 90 of FIG. 4 is selected to the output of amplifier unit 14. Upon the occurrence of a logic zero at the Y1 output of decoder 213, a mode one is entered wherein a character pattern indicated by the starting address ROMs 184 and 185 is accessed repeatedly. A mode two is entered when a logic zero appears at the Y2 output of decoder 213. During mode two, simulator 32 issues the character pattern indicated by ROMs 184 and 185, and proceeds to the end of the character pattern sequence stored in ROMs 194 and 195. Thereafter, the sequence is repeated beginning with the starting character pattern. The Y3 output of decoder 213 is a spare for further system expansion.

Figure 8C:
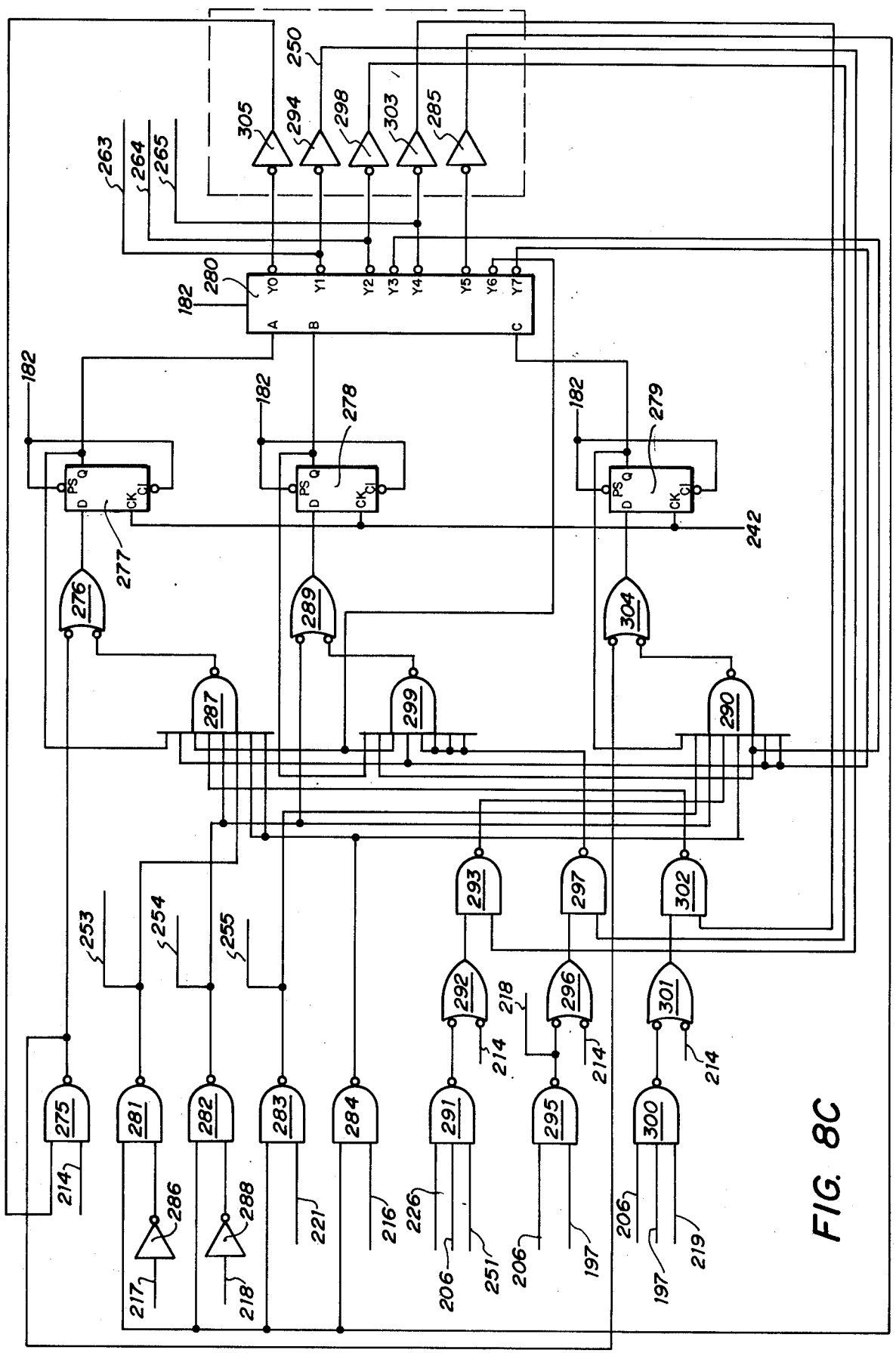

FIGS. 8b and 8c

FIGS. 8b and 8c illustrate in electrical schematic diagram form that part of simulator control unit 112 not disclosed in the description of FIG. 8a.

An 8 MHz crystal oscillator 235 has an output connected through an inverter 236 to the clock input of a flip-flop 237. The D input of the flip-flop 237 is connected to the $\overline{Q}$ output of the flip-flop, and the preset and clear inputs are connected to the +5 volt source 182. The Q output of flip-flop 237 is connected to one input of a NAND gate 238, a second input of which is connected to the output of crystal oscillator 235. The output of NAND gate 238 is connected through inverters 239 and 240 to a control line 183, and through inverter 239 and an inverter 241 to a control line 242. The output of NAND gate 238 also is connected through inverter 239 and an inverter 243 to the clock inputs of four bit counters 244, 245 and 246.

The clear inputs to counters 244–246 are connected to a control line 247. The ET enable and EP enable inputs of counter 244 are connected to the output of an inverter 248, the input of which is connected to the output of a NAND gate 249. One input of NAND gate 249 is connected to a control line 250, and second and third inputs are connected to control lines 206 and 226, respectively. The A, B, C, D and load inputs to counter 244 are each connected to +5 volt source 182. The carryover output of counter 244 is connected to the EP enable input of counter 245, and to the EP enable input of counter 246.

The ET enable A, B, C, D and load inputs of counter 245 are connected to voltage source 182. The carryover output of counter 245 is connected to the ET enable input of counter 246. The A, B, C, D and load inputs of counter 246 are connected to voltage source 182, and the carryover output of counter 246 is connected to a control line 251.

A NOR gate 252 has one input connected to a control line 253, a second input connected to a control line 254, and a third input connected to a control line 255. The output of NOR gate 252 is applied through an inverter 256 to control line 192 and to one input of a NOR gate 257. A second input of NOR gate 257 is connected to a control line 258. The output of NOR gate 257 connected through an inverter 259 to a control line 211. The output of gate 257 also is connected to one input of a NAND gate 260 having a second input connected to the output of inverter 239. The output of NAND gate 260 is applied through an inverter 261 to control line 189 leading to the clock inputs of counters 186–188, 222 and 223.

A NOR gate 262 has one input connected to a control line 263, a second input connected to a control line 264 and a third input connected to a control line 265. The output of NOR gate 262 is connected to one input of a NAND gate 266 having a second input connected to control line 204. A third input of gate 266 is connected to control line 214, and the output of gate 266 is connected to one input of a NOR gate 267. A second input of gate 267 is connected to control line 211. The output of NOR gate 267 is connected to one input of a NAND gate 268 having a second input connected the output of inverter 239. The output of NAND gate 268 is connected through an inverter 269 to control line 212 leading to the clock inputs of counters 201, counter 202 and register 203.

In operation, the output of inverter 248 transitions to a logic one each time a character pattern in ROMs 194 and 195 is completely sfanned in a mode two or single pattern operation. Each time the output of inverter 248 transitions to a logic one, the carryover output of counter 246 transitions to a logic one after a delay of 512 microseconds to initiate a next pattern scan.

Oscillator 235, flip-flop 237, gates 238, 262, 266, 252, 257, 260, 267 and 268, and inverters 236, 239–241, 243, 256, 261, and 269 comprise a timing control system for pattern simulation unit 32 of FIG. 4.

Referring to FIG. 8c, a NAND gate 275 has one input connected to control line 214, and an output connected to one input of a NOR gate 276. The output of NOR gate 276 is connected to the D input of a flip-flop 277, the preset and clear inputs of which are connected to +5 volt source 182.

The clock input of flip-flop 277 is connected to the clock input of a flip-flop 278, to the clock input of a flip-flop 279 and to control line 242 leading to the output of inverter 241. The Q output of flip-flop 277 is connected to C input of a three-to-eight line decoder 280.

A NAND gate 281 has one input connected to an input of a NAND gate 282, to an input of a NAND gate 283, to an input of a NAND gate 284, and to the output of an inverter 285. A second input to NAND gate 281 is connected to the output of an inverter 286, the input of which is connected to control line 217. The output of NAND gate 281 is connected to line 253 and to one input of a NAND gate 287. The output of gate 287 is connected to a second input of NOR gate 276.

A second input to NAND gate 282 is connected to the output of an inverter 288, the input of which is connected to control line 218. The output of NAND gate 282 is connected to control line 254 and to a second input of NAND gate 287. The output of gate 282 also is connected to one input of a NOR gate 289, and to one input of a NAND gate 290.

A second input to NAND gate 283 is connected to control line 221. The output of gate 283 is connected to control line 255 and to a second input of NAND gate 290. A second input of NAND gate 284 is connected to control line 216. The output of gate 284 is connected to a third input and a fourth input of NAND gate 287, and to a third input of NAND gate 290.

A NAND gate 291 has one input connected to control line 226, a second input connected to control line 206 and a third input connected to control line 251. The output of gate 291 is connected to one input of a NOR gate 292 having a second input connected to control line 214. The output of NOR gate 292 is connected to one input of a NAND gate 293, the second input of which is connected to control line 250 leading to the output of an inverter 294. The output of NAND gate 293 is connected to a fourth input of NAND gate 290.

A NAND gate 295 has one input connected to control line 206 and a second input connected to control line 197. The output of NAND gate 295 is connected to control line 218 and to one input of a NOR gate 296, a second input of which is connected to control line 214.

The output of NOR gate 296 is connected to one input of a NAND gate 297, a second input of which is connected to the output of an inverter 298. The output of NAND gate 297 is connected to four inputs of a NAND gate 299. The output of gate 299 in turn is connected to a second input of NOR gate 289. The output of NOR gate 289 is connected to the D output of flip-flop 278.

The preset and clear inputs to flip-flop 278 are each connected to +5 volt source 182, and the Q output of the flip-flop is connected a fifth input of NAND gate 299 and to the B input of decoder 280.

A NAND gate 300 has one input connected to control line 206, a second input connected to control line 197 and a third input connected to control line 219. The output of NAND gate 300 is connected to one input of a NOR gate 301 having a second input connected to control line 214. The output of NOR gate 301 is connected to one input of a NAND gate 302 having a second input connected to the output of an inverter 303. The output of NAND gate 302 is connected to a fifth input to NAND gate 287.

A fifth input to NAND gate 290 is connected to the Q output of flip-flop 279 and to the A input of decoder 280. A sixth input to NAND gate 290 is connected to the Y3 output of decoder 280, and the seventh and eighth inputs to NAND gate 290 are connected to the Y7 output of decoder 280. The output of NAND gate 290 is connected to one input of a NOR gate 304, the second input to which is connected to the output of NAND gate 275. The output of NOR gate 304 is connected to the D input of flip-flop 279. The preset and clear inputs to flip-flops 279 are each connected to +5 volt source 182.

A sixth input of NAND gate 299 is connected to the Y3 output of decoder 280, a seventh input is connected to the Y6 output of decoder 280 and to a sixth input of gate 287, and a seventh input is connected to the Y7 output of decoder 280 and to a seventh input of gate 287. The output of NAND gate 299 is connected to a second input of NOR gate 289.

The positive enable input to decoder 280 is connected to +5 volt source 182, while the negative enable input is connected to ground. The Y0 output of decoder 280 is connected through an inverter 305 to the second input of NAND gate 275. The Y1 output of decoder 280 is connected to control line 263 and to the input of inverter 294. The Y2 output of decoder 280 is connected to control line 264 and to the input of inverter 298. The Y4 output of decoder 280 is connected to control line 265 and to the input of inverter 303. The Y5 output of decoder 280 is connected to the input of inverter 285.

In operation, the system of FIG. 8c initially is in a quiescent state as represented by the logic zero states at the Q outputs of flip-flops 277-279. The flip-flops in combination generate a three bit binary code which is applied to decoder 280. Thus, while in the quiescent state, the Y0 output of decoder 280 will be at a logic zero to signify a state zero. If a mode zero operation is entered while a state zero condition exists, the Q outputs of flip-flops 277-279 remain in a logic zero state as controlled by gate 275. If a mode other than mode zero is selected, however, the Q outputs of flip-flops 277 and 279 transition to a logic one state while the Q output of flip-flop 278 remains at a logic zero state for one clock period. A binary 101 code is applied to decoder 280, and the Y5 output of the decoder transitions to a logic zero to indicate a state five condition. After one clock period, the state five condition is immediately followed by a state condition indicating the mode that has been entered. For example, if a mode one operation has been entered, the output of NAND gate 281 transitions to a logic zero and flip-flop 277 is reset. The binary code applied to decoder 280 then becomes a logic 001 which is decoded as a state one condition. If a mode two operation has been entered, the output of NAND gate 282 transitions to a logic zero to set flip-flop 278, and reset flip-flops 277 and 279. A binary 010 code is applied to decoder 280 to indicate a state two condition. If a mode three operation has been entered, the output of NAND gate 283 transitions to a logic zero, and flip-flop 277 is reset and flip-flops 278-279 are set. A logic 011 then is applied to decoder 280 to indicate a state three condition.

If a mode zero operation is entered during a state five condition, the output of NAND gate 284 transitions to a logic zero to reset flip-flops 277-279. Decoder 280 in response thereto indicates a state zero condition.

A simulated character pattern signal is comprised of numerous positive and negative going wave portions. Upon the occurrence of the end of each such wave portion, line 206 transitions to a logic one. Upon the occurrence of the end of a last wave portion comprising a simulated character pattern signal, line 226 transitions to a logic one. Further, when a complete character pattern has been accessed, line 251 transitions to a logic one after a delay of 512 microseconds. When each of lines 206, 226 and 251 are at a logic one state, the output of NAND gate 291 transitions to a logic zero. If the pattern simulator unit 32 is in a state one condition, flip-flop 279 is reset and decoder 280 thereafter indicates a state zero condition. Further, if the output of NAND gate 291 transitions to a logic one and the system has entered a mode zero operation during a state one condition, the flip-flop 279 will be reset and a logic 000 is supplied to decoder 280 to indicate a state zero condition.

If a sequence of character patterns is to be accessed to test the reading system, line 206 transitions to a logic one upon the occurrence of an end of each wave portion comprising each character pattern in the sequence. Line 297 transitions to a logic one upon the occurrence of the end of the last wave portion of the last character pattern in the sequence of patterns to be scanned. In this event, the output of NAND gate 295 transitions to a logic zero. If a state two condition exists, flip-flop 278 is reset to indicate a state zero condition. If the lines 206 and 197 do not simultaneously transition to a logic one state during a state two condition, and a mode zero operation has been entered, flip-flop 278 is reset as before.

If lines 197, 219 and 206 are each at a logic one state during a state four condition, the output of NAND gate 300 transitions to a logic zero and flip-flop 277 is reset. Thereafter, decoder 280 indicates a state zero condition. If the output of NAND gate 300 is in a logic one state after a mode zero operation has been entered, and a state four condition exists, flip-flop 277 also shall be reset to indicate a state zero condition.

FIG. 8d

Figure 8D:
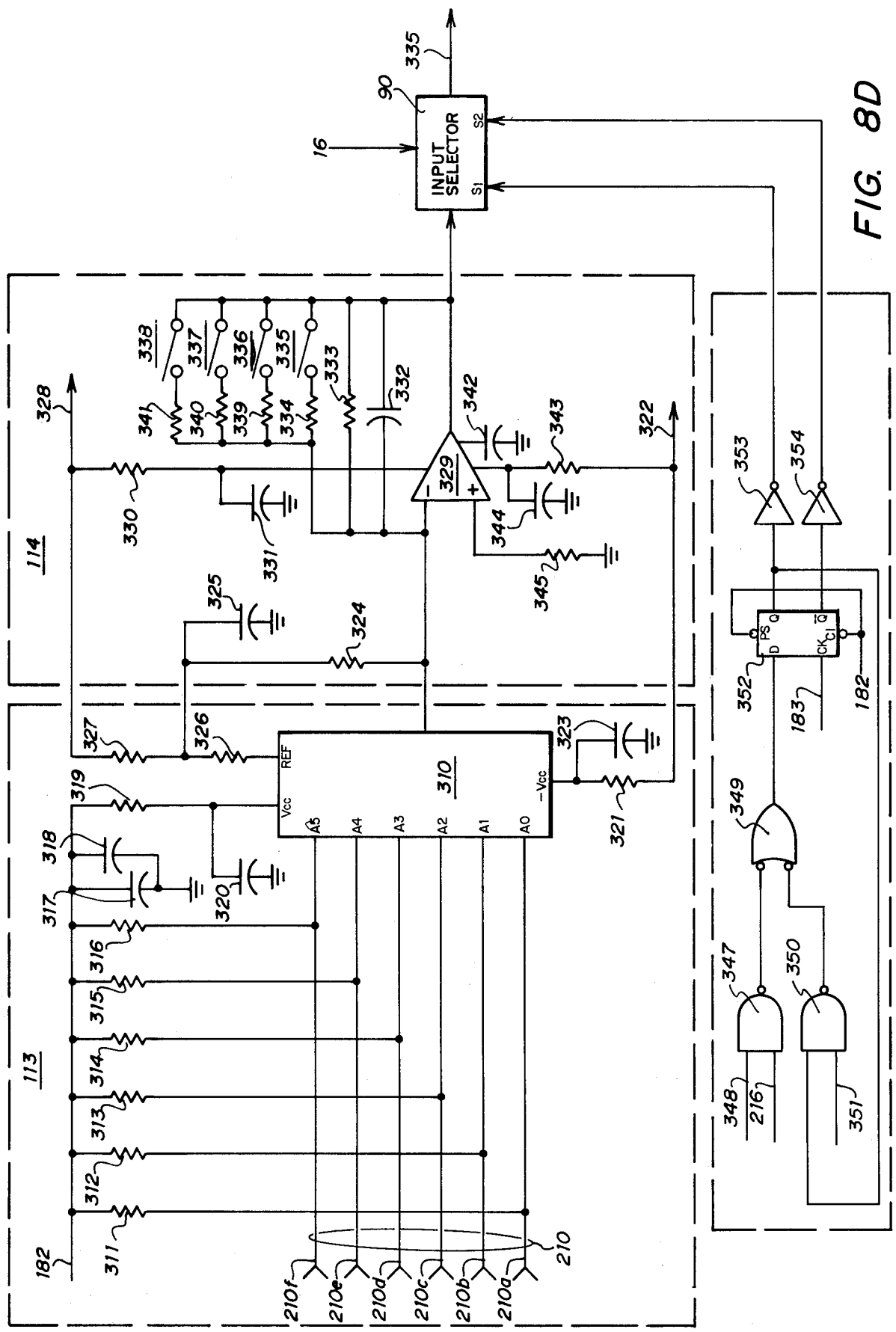

FIG. 8d illustrates in electrical schematic diagram form the pattern generator 113, gain control and fan-out unit 114, and selection logic interfacing decoder 213 of FIG. 8a with input selector 90.

Referring to FIG. 8D, the Q1-Q6 outputs of buffer register 203 of FIG. 8a are applied by way of data lines 210 to the A0-A5 inputs, respectively, of a digital-to-analog converter 310. Lines 210a-210f also are applied through 2.0 K-ohm resistors 311-316, respectively, to +5 volt source 182. Voltage source 182 also is connected to one terminal of a 22 microfarad capacitor 317, to one terminal of a 0.10 microfarad capacitor 318, through a 47 ohm resistor 319 to a first terminal of a 1.0 microfarad capacitor 320, and through resistor 319 to the positive power input of converter 310. The second terminal of capacitor 317 is connected to the second terminal of capacitor 318 and to ground. The second terminal of capacitor 320 also is connected to ground. The negative power input of converter 310 is connected through a 47 ohm resistor 321 to a −15 volt source 322, and through a 1.0 microfarad capacitor 323 to ground. The I0 output of converter 310 is connected to the negative input of a differential amplifier 329, through a 15 K-ohm resistor 324 and a 0.10 microfarad capacitor 325 to ground, through resistor 324 and a 7.5 K-ohm resistor 326 to a reference voltage input of converter 310, and through resistor 324 and a 47 ohm resistor 327 to a +15 volt source 328.

Voltage source 328 also is connected through a 47 ohm resistor 330 and a 1.0 microfarad capacitor 331 to ground, and through resistor 330 to a positive power input of amplifier 329.

The negative input of amplifier 329 also is connected through a 43 picofarad capacitor 332 to the output of the amplifier, through a 2.49 K-ohm resistor 333 to the output of the amplifier, and through a 103 ohm resistor 334 to a contact terminal of a −48 db mechanical switch 335. The switch arm of switch 335 is connected to the output of amplifier 329, to the switch arm of a −24 db switch 336, to the switch arm of a −12 db switch 337 and to the switch arm of a −6 db switch 338.

The negative input to amplifier 329 further is connected through a 622 ohm resistor 339 to the contact terminal of switch 336, through a 1.245 K-ohm resistor 340 to the contact terminal of switch 337 and through a 2.49 K-ohm resistor 341 to the contact terminal of switch 338. The frequency compensation output of amplifier 329 is connected through a 10 picofarad capacitor 342 to ground. The negative power input to amplifier 329 is connected through a 47 ohm resistor 343 to voltage source 322, and through a 1.0 microfarad capacitor 344 to ground. The positive input to amplifier 329 is connected through a 220 ohm resistor 345 to ground. The output of amplifier 329 further is connected to control line 35a of FIG. 4.

Digital to analog converter 310 with its associated network comprises pattern generator 113 of FIG. 4. Differential amplifier 329 with its associated network, and mechanical switches 335-338 comprise gain control and fan out unit 114 of FIG. 4.

A first input of a NAND gate 347 is connected to a control line 348 leading to the output of inverter 305 of FIG. 8c, and the second input to gate 347 is connected to control line 216 leading to the output of inverter 215 of FIG. 8a. The output of gate 347 is connected to one input of a NOR gate 349 having a second input connected to the output of a NAND gate 350. One input of gate 350 is connected to a control line 351 leading to the output of NAND gate 275 of FIG. 8c. The output of gate 349 is connected to the D input of a flip-flop 352.

The clock input to flip-flop 352 is connected to control line 183 carrying a 4 MHz clock signal, and the preset and clear inputs to the flip-flop are connected to the +5 volt source 182. The Q output of flip-flop 352 is applied through an inverter 353 to the S1 select input of input selector unit 90, and to a second input of NAND gate 350. The $\overline{Q}$ output of flip-flop 352 is applied through an inverter 354 to the S2 select input of unit 90.

As before described, unit 90 selects between the simulated character pattern provided on data channel 35a, and the character image signal on channel 16 generated from the analog responses of a sensor array passing through registration with a document having a magnetic character printed thereon. The selected input to unit 90 is applied to a data channel 355 leading to Bessel filter 91.

In operation, one of switches 335-338 is closed to test the dynamic range of the reading system described herein. The simulated character pattern provided on data lines 210 is converted from a digital to an analog format by converter 310, and amplified by amplifier 329.

A synchronization signal on line 348 is sensed to synchronize the selection of data with the initial scan of a simulated character pattern. The signal on control line 216 indicates whether the real data or the simulated data is selected. If both lines 348 and 216 are high, the real data is selected and a logic one state is applied at the D input of flip-flop 352. The D input of the flip-flop remains at the logic one state so long as either lines 348 and 216 remain high or line 351 remains high. Since the preset and clear inputs to the flip-flop are disabled, the Q output of the flip-flop transitions to a logic one upon the next occurrence of a clock signal. A logic zero is applied to the S1 select input and a logic one is applied to the S2 select input of unit 90, and data channels 16 are selected for output on data channel 355.

Upon selecting the simulated data at the manual control panel 29, mode control bits on control lines 33 are received by mode select decode unit 110 of FIG. 4. In response thereto, line 351 transitions to a logic zero. Thereafter, lines 216 and 351 transition to a logic zero to apply a logic zero state to the D input of flip-flop 352. The Q output of the flip-flop transitions to a logic zero upon the occurrence of a next clock signal, and a logic one state is applied to the S1 select input and a logic zero state is applied to the S2 select input of unit 90. Unit 90 is response thereto selects data channel 35a for output on data channel 355.

FIG. 9

Figure 9:
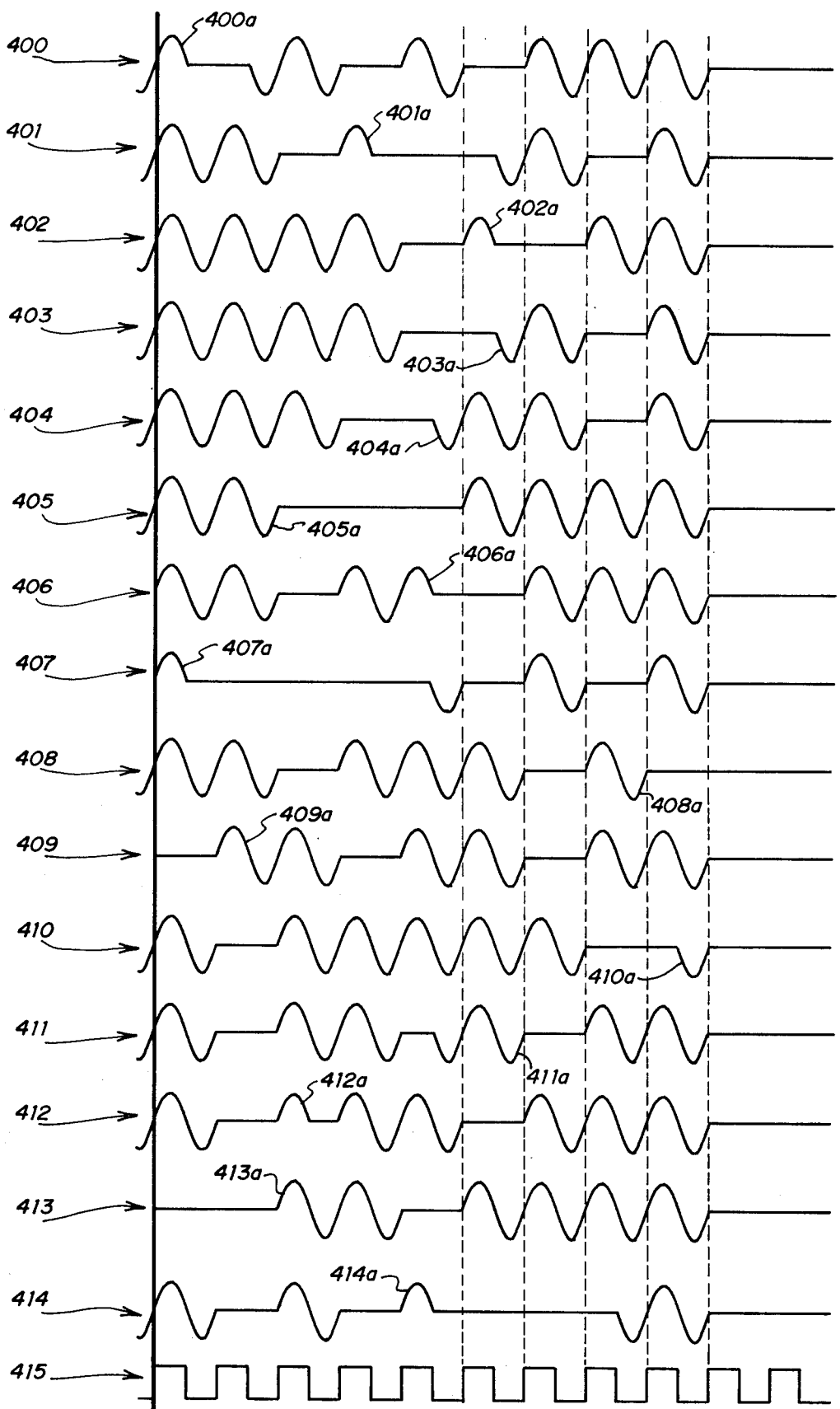
FIG. 9 is a timing and waveform diagram of CMC7 numeric and special character patterns generated by the character pattern simulator of FIG. 1.

FIG. 9 is a timing and waveform diagrasm of CMC7 numeric and special character patttterns generated by simulator control unit 112, and applied through pattern generator 113 and fan out unit 114 to input selector unit 90. Each of the patterns has included therein errors to be detected in the testing of the reading system.

Waveform 400 illustrates a character pattern signal for a numeric zero wherein a trailing edge and a leading edge signal have been deleted after waveform portion 400a. Waveform 401 illustrates a character pattern signal for a numeric one wherein two trailing edges and two leading edges have been deleted immediately following a wave portion 401a. Waveform 402 illustrates a character pattern signal for a numeric two wherein a trailing edge has been deleted immediately after wave portion 402a. Waveform 403 illustrates a character pattern signal for a numeric three wherein a leading edge has been deleted immediately preceding wave portion 403a. Waveform 404 is a character pattern signal wherein a leading edge has been deleted immediately preceding wave portion 404a. Waveform 405 is a character pattern signal for a numeric five wherein a leading and a trailing edge have been deleted immediately after wave portion 405a. Waveform 406 illustrates a character pattern signal for a numeric six wherein a trailing edge has been deleted immediately after wave portion 406a. Waveform 407 illustrates a character pattern signal for a numeric seven wherein four trailing edges interlaced with four leading edges have been deleted immediately after wave portion 407a. Waveform illustrates a character pattern signal for a numeric eight wherein a leading edge and a trailing edge have been deleted immediately after wave portion 408a. Waveform 409 illustrates a character pattern signal for a numeric nine wherein a leading edge and a trailing edge have been deleted immediately preceding wave portion 409a.

Waveform 410 illustrates a pattern signal for a special character generally referred to as CMC7 special character A, wherein a leading edge has been deleted immediately preceding wave portion 410a. Waveform 411 illustrates pattern signal for a special character generally referred to as CMC7 special character B, wherein a leading and a trailing edge signal have been deleted immediately after wave portion 411a. Waveform 412 illustrates a pattern signal for a special character generally referred to as CMC7 special character C, wherein a trailing edge signal has been omitted immediately after wave portion 412a. Waveform 413 illustrates a pattern signal for a special character generally referred to as CMC7 special character D, wherein a leading and a trailing edge have been deleted prior to wave portion 413a. Waveform 414 illustrates a pattern signal for a special character generally referred to as CMC7 special character E, wherein three trailing edges interlaced with three leading edges have been omitted immediately following wave portion 414a. Each of the patterns may be modified by changing the contents of the pattern ROMs of simulator control unit 112.

Waveform 415 is a 66.67 KHz clock signal providing a time reference for waveforms 400-414.

FIG. 10

Figure 10:
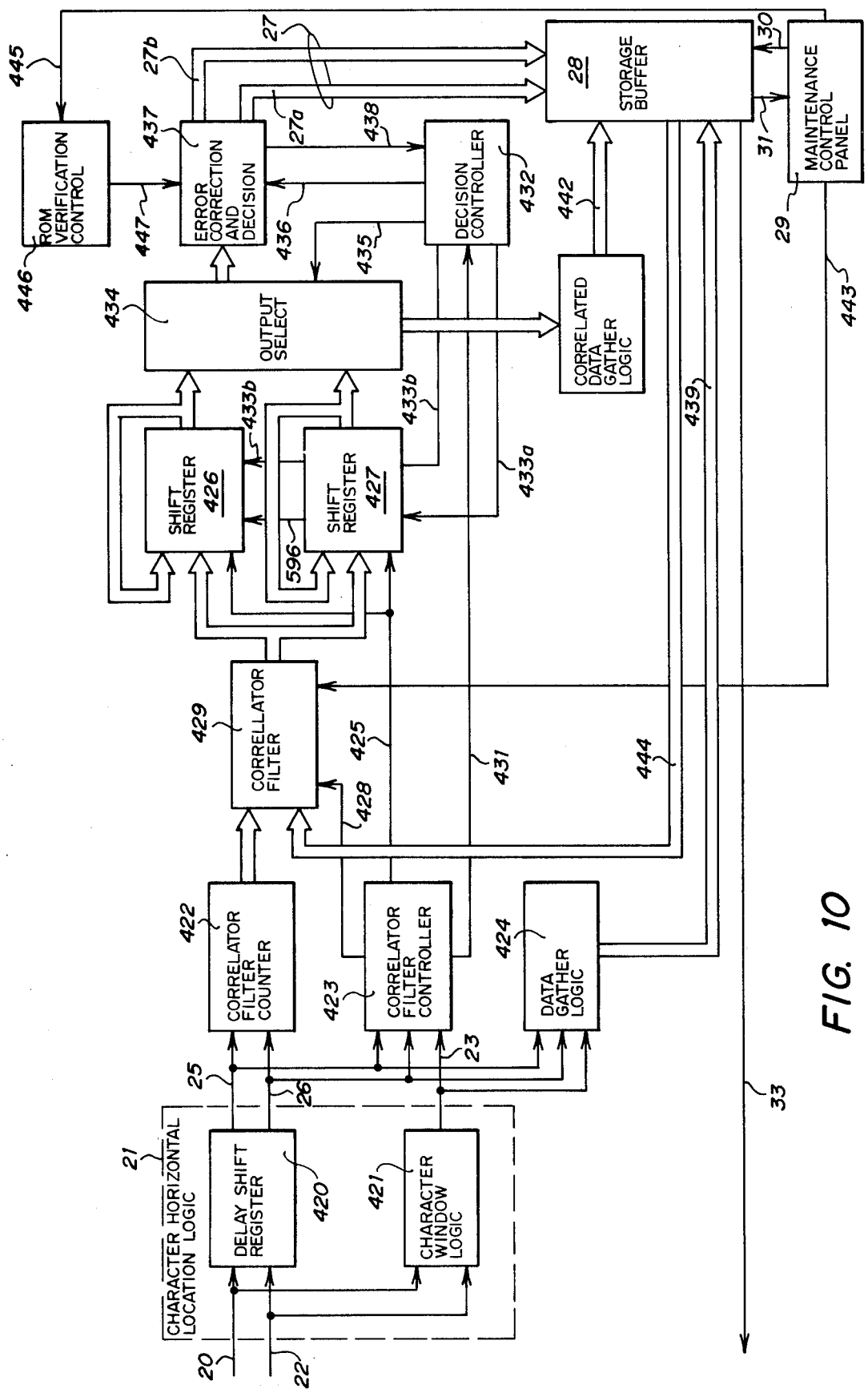
FIG. 10 is a functional block diagram of the character horizontal location logic unit, and the recognition and error correction unit of FIG. 1.

FIG. 10 illustrates in a more detailed functional block diagram form the character horizontal location logic unit 21 and, the recognition and error correction unit 24 of FIG. 1.

Upon a leading edge of a character stroke being detected, a pulse is received by a delay shift register 420 by way of data channel 20. Channel 20 also is connected to one input of a character window logic unit 421. Upon detecting the trailing edge of the character stroke passing in registration with the sensor array, a pulse is applied to data channel 22 leading to a second input of shift register 420 and to a second input of logic unit 421. Shift register 420 delays the trailing edge and the leading edge signals received on data channels 20 and 22 for a period of 300 microseconds. The delayed leading edge signal then is applied to data channel 25 leading to one input of a correlator filter counter 422, to one input of a correlator filter controller 423 and to one input of a data gather logic unit 424. The delayed trailing edge signals are applied to data channel 26 leading to a second input of filter 422, a second input of filter controller 423 and to a second input of logic unit 424.

Character window logic unit 421 generates a character window pulse in response to the signals on data channels 20 and 22, and applies such pulse to a third input of filter controller 423 and to a third input of logic unit 424. The character window pulse in the preferred embodiment described herein has a leading edge which occurs about 8 microseconds prior to the first leading edge pulse on data channel 25, and a trailing edge pulse which occurs about 8 microseconds after the last trailing edge pulse on control line 26. Shift register 420 and logic unit 421 comprise horizontal location logic unit 21 of FIG. 1.

Correlator filter counter 422 receives leading and trailing edge information on data channels 25 and 26, and forms therefrom two interval data (I.D.) words indicating the interval in microseconds between consecutive leading edges and the interval between consecutive trailing edges. The filter counter also estimates leading and trailing edge intervals by subtracting 15 microseconds from the time interval between adjacent leading edges or adjacent trailing edges, or by adding 15 microseconds to the time interval between a trailing edge and an adjacent leading edge. 15 microseconds is the estimated average CMC7 character stroke width.

As a printed magnetic ink character is being scanned, filter controller 423 tracks the character window pulse on channel 23 to detect an intercharacter space. Upon detecting an intercharacter space, controller 423 issues a two bit code on a control channel 425 leading to inputs of shift registers 426 and 427 to indicate the occurrence of a leading intercharacter space, a lagging intercharacter space, or intervals between character strokes of a character pattern. The correlator filter controller 423 also detects a missing edge of a character stroke in a character pattern signal, and replaces the missing edge based upon an estimation of the character stroke width. Upon detecting missing edges or no missing edges, controller 423 issues a command pulse on a control channel 428 to select input S1 of a correlator filter multiplexer 429. Outputs of correlator filter counter 422 appearing on a data channel 430 thereby are selected. Controller 423 in addition issues a signal on a control channel 431 leading to one input of a decision controller 432 to indicate that data from filter counter 422 may be loaded into one of 8 × 18 bit shift registers 426 and 427 to store one two bit data status word and two 8 × 4 ID words representative of leading and trailing edge intervals.

In response thereto, controller 432 issues a load signal on one of control lines 433a or 433b to load register 426 or register 427, respectively. When a corrected character image has been stored in either of the shift registers, filter controller 423 issues a command signal on control channel 431 to decision controller 432 to initiate an error correction process. Controller 432 thereupon issues a select signal to unit 434 on a control channel 435 to select the output of register 426 or register 427, and a begin error correction signal on a control channel 436 leading to an error correction and decision unit 437.

Shift registers 426 and 427 operate in two modes. The first is an input mode for storing a character image. One character image including both trailing and leading edge information is stored in one of shift registers 426 and 427, and thereafter is processed while the second of the two registers is being loaded with a second character image. The second mode of operation is a recirculating mode wherein a character image is restored in the shift register when the output of the register is selected by output select unit 434.

Unit 437 detects missing strokes in a character image, and replaces missing character strokes where such omissions are correctable. Controller 432 monitors the error correction status signals on a control channel 438, and upon completion of the error correction process issues a begin character decision signal on channel 436 after detecting the occurrence of six intracharacter intervals. The character decision process is executed by the correction and decision logic unit 437 to provide a leading edge character decision, and a trailing edge character decision. If the two character decisions are identical, an eight bit character identification code is supplied to storage buffer 28 by way of data channel 27a. If the trailing edge and leading edge decisions are not identical, however, that decision is selected which has the proper parity, i.e., two long and four short intervals, and the least number of time interval mismatches.

As a printed CMC7 character is scanned, data gather logic 424 supplies by way of a data channel 439 the time interval between the leading edge of a character window and the leading edges of the detected strokes, and the time interval between the leading edge of a character window and the trailing edges of such strokes for storage in buffer 28.

During the error correction and character decision processes, a correlated data gather logic unit 440 receives the interval data words stored in registers 426 and 427, and supplied by output select unit 434 to a data channel 441. Logic unit 440 stores such information in buffer 28 by way of a data channel 442. The contents of buffer 28 may be addressed by maintenance control panel 29 and viewed on a display panel.

In order to provide an automated self-checking feature, an operator at the panel 29 may provide a selection signal on a control channel 443 leading to the S2 select input of multiplexer 429. A data channel 444 leading from buffer 28 then is selected to provide simulated character image data to storage registers 426 and 427. In addition, command codes controlling the operation of pattern simulator unit 32 are supplied by buffer 28 to control channel 33. A further self-checking feature provides for a panel 29 generated signal to be applied to a control channel 445 leading to a ROM verification control unit 446. Unit 446 thereupon issues control signals on a control channel 447 to direct the transfer of information from ROMs comprising error correction and decision unit 437 to storage buffer 28 by way of data lines 27b. Such information then may be displayed on maintenance panel 29.

FIG. 11

FIG. 11 is an electrical schematic diagram of the character horizontal location logic unit 21 of FIG. 10.

Leading edge signals on data channel 20 are applied to a shift register 500 which applies 300 microsecond delay to the signals. Channel 20 is attached to one input of an OR gate 501 having a second input connected to data channel 22. Channel 22 also is connected to the input of a shift register 502 applying a 300 microsecond delay to trailing edge signals. The output of shift registers 500 and 502 are applied to data channel 25 and 26, respectively. The output of OR gate 501 is applied to the start input of a 34 microsecond counter 503, the output of which is connected to the input of an edge detector 504 and through an inverter 505 to one input of an AND gate 506.

The output of edge detector 504 is supplied to a shift register 507 which applies a delay of 270 microseconds.

The output of shift register 507 is connected to a second input of AND gate 506, the output of which is applied to the start input of a window generator 508. The output of window generator 508 then is applied to a control line 509 leading to inputs of filter controller 423 and data gather logic unit 424.

FIG. 12

Figure 12:
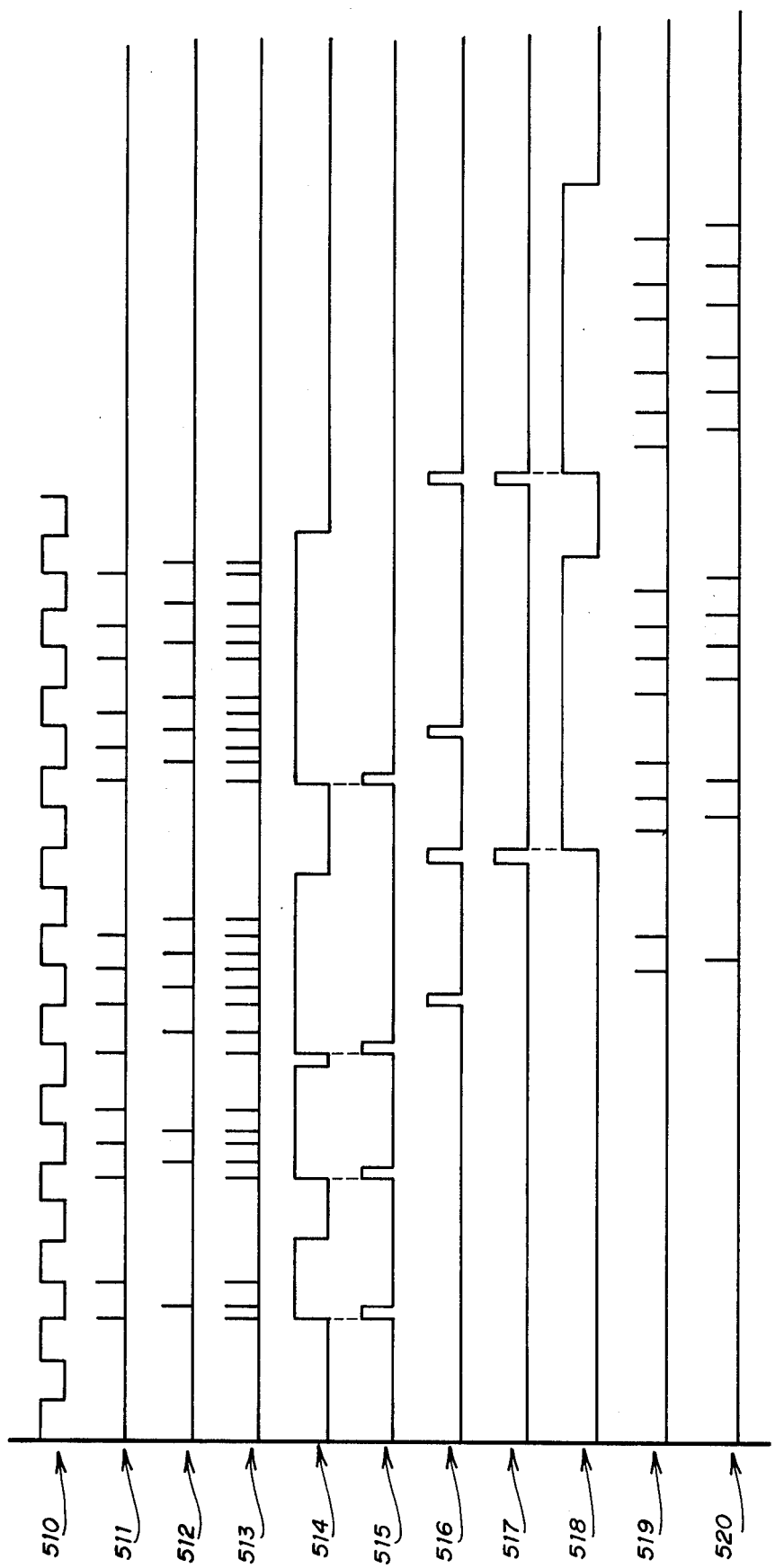
FIG. 12 is a timing and output waveform diagram of the operation of the character horizontal location logic unit of FIG. 10.

The operation of the logic system of FIG. 11 may be understood with reference to FIG. 12, a timing and output waveform diagram of the window logic operation.

Waveform 510 illustrates a 29.4 KHz clock signal providing a time reference in the description of FIG. 12. Waveforms 511 and 512 illustrate leading and trailing edge signals applied to data channels 20 and 22. If there is no missing edge in a character stroke, each leading edge pulse of waveform 511 is followed by a trailing edge pulse of waveform 512. Waveform 513 illustrates the output of OR gate 501 in response to waveforms 511 and 512. Waveform 514 illustrates the output of counter 503 in response to a start signal from OR gate 501. As may be seen by inspection of waveforms 513 and 514, counter 503 is restarted upon each occurrence of a logic one pulse at the output of OR gate 501. After the occurrence of pulse 513a, no intermediate pulse occurs before a full count of thirty-four microseconds is made.

Waveform 515 illustrates the output of edge detector 504 wherein pulses indicating the leading edges of the counter 503 output are indicated. Waveform 516 illustrates the output of shift register 507 wherein pulses of waveform 515 are delayed 270 microseconds. Waveform 517 illustrates the output of AND gate 506. As may be seen from an inspection of waveforms 514, 516 and 517, a logic one pulse occurs at the output of AND gate 506 when the output of shift register 507 is at a logic one and the output of counter 503 is at logic zero. Waveform 518 illustrates the character window output of window generator 508 wherein it is seen that the leading edges of successive character windows occur at the trailing edges of the pulses of waveform 517. Waveforms 519 and 520 illustrate the outputs of shift registers 500 and 502, respectively.

Figure 13B:
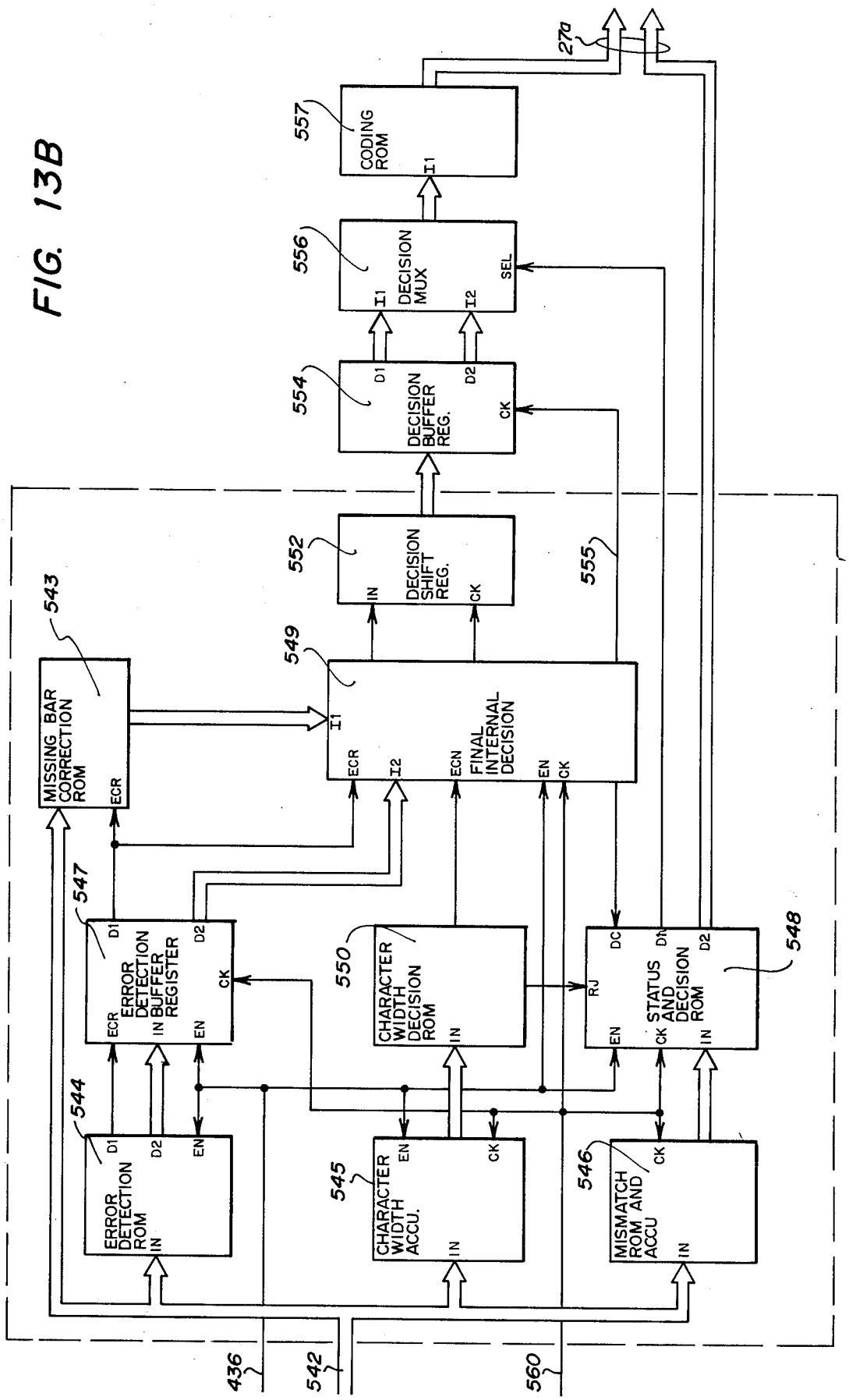

FIGS. 13a and 13b

FIGS. 13a and 13b illustrate in a more detailed functional block diagram form the correlator filter counter 422, and the error correction and decision logic unit 437 of FIG. 10.

Leading edge signals are received on data channel 25 from data shift register 420 of FIG. 10. The leading edge signals are applied to the start input of an eight bit counter 530, the load input of an eight bit buffer register 531, the load input of an eight bit buffer register 532, the load input of an eight bit buffer register 533, the start input of an eight bit counter 534 and to one input of correlator filter controller 423. Trailing edge signals from register 420 are applied by way of data channel 26 to the start input of an eight bit counter 535, to the start input of an eight bit counter 536, to the load input of an eight bit buffer register 537, to the load input of an eight bit buffer register 538 and to a second input of controller 423.

A decimal zero is applied by way of a data channel 530a to the input of counter 530, and to the input of counter 536. A decimal 15 is applied by way of a data channel 535a to the input of counter 535, and a minus decimal 15 is applied by way of a data channel 534a to the input of counter 534. It is to be understood that the decimal 15 value corresponds to an estimated character stroke width 15 microseconds. Such stroke widths, however, may vary from 10 to 20 microseconds depending upon the CMC7 font.

The output of counter 530 is applied to the input of buffer register 531, and the output of buffer register 531 is connected to the input of buffer register 532 and to the I2 input of the multiplexer 429. The output of buffer register 532 is connected to the I1 input of multiplexer 429.

The output of counter 535 is connected to the input of buffer register 533, the output of which is connected to the I3 input of multiplexer 429. The output of counter 536 is connected to the input of buffer register 537. The output of buffer register 537 is connected to the I4 input of multiplexer 429. The output of counter 534 is connected to the input of buffer register 538, the output of which is connected to the I5 input of multiplexer 429.

Leading edge information is provided at the D1 output of multiplexer 429 leading to the I1 inputs of shift registers 426 and 427. Trailing edge information at the D2 output of the multiplexer is supplied to the I3 inputs of shift registers 426 and 427.

Counters 530, 535, 536 and 534, and buffer registers 531, 532, 533, 537 and 538 comprise correlator filter counter 422 of FIG. 10.

The I2 inputs of shift registers 426 and 427 are connected to control channel 425 leading from an output of correlator filter controller 423. The D1-D3 outputs of register 426 are applied to the I1-I3 inputs of a multiplexer 539, and the D1-D3 outputs of register 427 are connected to the I4-I6 inputs of multiplexer 429. The clock input of shift register 426 is connected by way of line 433b to one output of decision controller 432, and the clock input to shift register 427 is connected by way of line 433a to a second output of controller 432.

In the preferred embodiment described herein, shift registers 426 and 427 each are comprised of two 8 × 8 bit shift registers and one intermediate 8 × 2 bit shift register. The leading edge and trailing edge interval data words are shifted through the 8 × 8 bit registers, and the two data status bits coded words on channel 425 are shifted through the 8 × 2 bit registers.

The D1 and D3 outputs of multiplexer 539 are connected to the I1 and I3 inputs of a multiplexer 540. The select input to multiplexer 539 is connected to a control line 435a leading from a third output of controller 432, and the select input to multiplexer 540 is connected by way of a control line 435b to a fourth output of the controller. The D2 output of multiplexer 539 is connected by way of a control channel 541 to an input of controller 432. Multiplexers 539 and 540 comprise output select unit 434 of FIG. 10.

The output of multiplexer 540 is applied by way of a data channel 542 to the input of a missing bar correction ROM 543, to the input of an error detection ROM 544, to the input of a character width accumulator 545 and to the input of a mismatch accumulator unit 546. Decision controller 432 applies an enable signal to control channel 436 leading to the enable inputs of buffer 547, ROM 544, accumulator 545, a status and decision ROM 548, and a final interval decision logic unit 549.

An output D1 of ROM 544 is connected to the inputs of ECR (error correction request) buffer register 547, and the data D2 output of ROM 544 is connected to the data input of buffer register 547. The D1 output of buffer register 547 is connected to the ECR inputs of ROM 543 and the final interval decision logic unit 549. The D2 data output of buffer register 547 is connected to the I2 input of logic unit 549. Further, the output of ROM 543 is connected to the I1 input of logic unit 549.

The output of accumulator 545 is connected to the data input of a character width decision ROM 550, one output of which is connected to the error correction enable (ECN) input of logic unit 549. A second output of ROM 550 is connected po the reject (RJ) input of ROM 548.

One output of logic unit 549 is connected to the data input of an eight bit decision shift register 552, and a second output of logic unit 549 is connected by way of control line 553 to the clock input of shift register 552. In addition, a third output of logic unit 549 is connected to the clock input of a 2 × 6 bit decision buffer register 554 by way of a control line 555.

The output of shift register 552 is connected to the input of a decision buffer register 554. The D1 output of register 554 is connected to the I1 input of a decision multiplexer 556, and the D2 output of register 554 is connected to the I2 input of multiplexer 556. The select input of multiplexer 556 is connected to the D1 output of ROM 548, and the output of the multiplexer is connected to the input of an EBCIDC coding ROM 557. The output of ROM 557 is connected to data lines comprising data channel 27a of FIG. 10.

The output of mismatch accumulation unit 546 is connected to the data input of ROM 548, the D2 data output of which is connected to data lines comprising data channel 27a.

ROMs 543, 544, 550, 548 and 557, buffer register 547, accumulator 545, mismatch and accumulator unit 546, logic unit 549, and shift register 552 comprise error correction and decision unit 437 of FIG. 10.

A system clock unit 558 supplies a 1 MHz clock signal on a control line 559 to the clock inputs of counter 530, counter 535, counter 536 and counter 534. Unit 558 also supplies a 500 KHz clock signal on a control line 560 to the clock inputs of accumulator 545, mismatch accumulator unit 546, ROM 548, logic unit 549, buffer register 547 and decision controller 432.

In the preferred embodiment described herein, mismatch accumulator unit 546 is comprised of a mismatch ROM having stored therein mismatch values indicative of the degree of mismatch with a reference time interval range. The output of the ROM is fed to an accumulator for adding the mismatch values supplied by the ROM.

ROMs 543, 544, 548, 550 and 555, and the ROM of unit 546 are 256 × 4 bits in size. The operation of the missing bar correction ROM 543 may be understood by reference to TABLE I. An eight bit interval word is applied to the input of ROM 543, which in response thereto issues a three bit word including an ID logic level and a multiplier. The corresponding output of decision shift register 552 is tabulated under the Interval Decision heading of TABLE I. Thus, if an interval data (ID) word indicating a time interval between 0 and 40 microseconds addresses ROM 543, a logic zero level and a zero multiplier will be output by ROM 543. Further, logic unit 549 adds no extra pulse to the clock signal on control line 553. Nor is an extra clock pulse added if the ID word indicates a time interval between 41 and 58 microseconds. If an ID word indicates a time interval between 59 and 65 microseconds, however, the current logic level of the ID data at the output of logic unit 549 is extended an extra clock period. Similarly, two clock pulses are added to line 553 and the current interval data logic level is extended two clock periods for ID indicating time intervals between 85 and 95 microseconds. In addition, a time period multiplier of one is used for time intervals between 96 and 105 microseconds, and a multiplier of three is used for time intervals between 115 and 125 microseconds.

is supplied at the D1 output of the ROM and a logic zero state is supplied at the D2 output.

The operation of the ROM of mismatch accumulator unit 546 may be understood by reference to TABLE II. The ROM of unit 546 is addressed by an eight bit word comprised of two hexadecimal digits. For each address of two hexidecimal digits, a four bit hexadecimal digit is output.

TABLE II

| FIRST DIGIT OF ROM ADDRESS | SECOND DIGIT OF ROM ADDRESS | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| 0 | C | C | C | C | C | C | C | C | C | C | C | C | C | C | C | C |
| 1 | C | C | A | 8 | 8 | 6 | 4 | 2 | 0 | 0 | 0 | 0 | 0 | 0 | 0 | 0 |
| 2 | 0 | 0 | 0 | 0 | 1 | 2 | 3 | 6 | A | 6 | 3 | 1 | 0 | 0 | 0 | 0 |
| 3 | 0 | 0 | 0 | 0 | 0 | 0 | 0 | 0 | 0 | 1 | 2 | 3 | 4 | 4 | 4 | 4 |
| 4 | 4 | 4 | 4 | 4 | 4 | 4 | 4 | 4 | 4 | 4 | 4 | 4 | 4 | 4 | 4 | 4 |
| 5 | 4 | 4 | 4 | 4 | 4 | 4 | 4 | 4 | 4 | 4 | 4 | 4 | 4 | 4 | 4 | 4 |
| 6 | 4 | 4 | 4 | 4 | 4 | 4 | 4 | 4 | 4 | 4 | 4 | 4 | 4 | 4 | 4 | 4 |
| 7 | 4 | 4 | 4 | 4 | 4 | 4 | 4 | 4 | 4 | 4 | 4 | 4 | 4 | 4 | 4 | 4 |
| 8 | 4 | 4 | 4 | 4 | 4 | 4 | 4 | 4 | 4 | 4 | 4 | 4 | 4 | 4 | 4 | 4 |
| 9 | 4 | 4 | 4 | 4 | 4 | 4 | 4 | 4 | 4 | 4 | 4 | 4 | 4 | 4 | 4 | 4 |
| A | 4 | 4 | 4 | 4 | 4 | 4 | 4 | 4 | 4 | 4 | 4 | 4 | 4 | 4 | 4 | 4 |
| B | 4 | 4 | 4 | 4 | 4 | 4 | 4 | 4 | 4 | 4 | 4 | 4 | 4 | 4 | 4 | 4 |
| C | 4 | 4 | 4 | 4 | 4 | 4 | 4 | 4 | 4 | 4 | 4 | 4 | 4 | 4 | 4 | 4 |
| D | 4 | 4 | 4 | 4 | 4 | 4 | 4 | 4 | 4 | 4 | 4 | 4 | 4 | 4 | 4 | 4 |
| E | 4 | 4 | 4 | 4 | 4 | 4 | 4 | 4 | 4 | 4 | 4 | 4 | 4 | 4 | 4 | 4 |
| F | 4 | 4 | 4 | 4 | 4 | 4 | 4 | 4 | 4 | 4 | 4 | 4 | 4 | 4 | 4 | 4 |

TABLE I

| ID WORDS IN MICROSECONDS | ID LOGIC LEVEL | MULTIPLIER | INTERVAL DECISION |
|---|---|---|---|
| 0-40 | 0 | 0 | 0 |
| 41-58 | 1 | 0 | 1 |
| 59-65 | 0 | 1 | 0,0 |
| 85-95 | 0 | 2 | 0,0,0 |
| 96-105 | 1 | 1 | 1,1 |
| 115-125 | 0 | 3 | 0,0,0,0 |

ROM 544 has stored therein error correction request and ID words. If an ID word indicating a time interval between 0 and 23 microseconds addresses ROM 544, a logic one state is supplied at the D1 output of the ROM and a logic zero state is supplied at the D2 output. The D1 output of the ROM 544 is the error correction request bit which enables the missing bar correction ROM 543. If an ID word indicating a time interval between 24 and 36 microseconds addresses ROM 544, a logic zero states are supplied at both the D1 and D2 outputs. For a time interval between 37 and 43 microseconds, a logic one state is supplied at the D1 output and a logic zero state is supplied at the D2 output. If a time interval between 44 and 56 microseconds is indicated, a logic zero state is supplied at the D1 output of the ROM and a logic one state is supplied at the D2 output. For time intervals greater than 56 microseconds, a logic one state The ROM 548 is addressed by the four bit output of unit 546, and in response thereto issues a selection signal to multiplexer 556 and a status signal to channel 27a. More particularly, the sum of the leading edge mismatches are compared with the sum of the trailing edge mismatches of a character image. If the leading edge sum is less than the trailing edge sum, multiplexer 556 is selected to the leading edge decision. If the leading edge sum is equal to or greater than the trailing edge sum, however, multiplexer 556 is selected to the trailing edge decision.

The character width decision ROM 550 is patterned to output a logic one state when an eight bit word addressing the ROM indicates a character width between 161 and 249 microseconds inclusive. If the character width is less than 161 microseconds or more than 249 microseconds, however, the ROM output is a logic zero state indicating a character reject.

Coding ROM 557 is comprised of two ROM chips, each addressed by six interval data words comprising a CMC7 character. The pattern for each of the ROM chips is tabulated in TABLES IIIa and IIIb. The eight bit output of ROM 557 is an EBCIDC code representing the character identified, wherein the first four bits of the code are supplied by the ROM chip having the TABLE IIIa pattern and the last four bits are supplied by the ROM chip having the TAABLE IIIb pattern.

TABLE IIIa

| FIRST DIGIT OF ROM ADDRESS | SECOND DIGIT OR ROM ADDRESS | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| 0 | 0 | 0 | 0 | 7 | 0 | 7 | F | 0 | F | 7 | F | 0 | F | 0 | 0 | 0 |
| 1 | 0 | 7 | F | 0 | F | 0 | 0 | 0 | F | 0 | 0 | 0 | 0 | 0 | 0 | 0 |
| 2 | 0 | 7 | F | 0 | F | 0 | 0 | 0 | F | 0 | 0 | 0 | 0 | 0 | 0 | 0 |
| 3 | F | 0 | 0 | 0 | 0 | 0 | 0 | 0 | 0 | 0 | 0 | 0 | 0 | 0 | 0 | 0 |
| 4 | 4 | 4 | 4 | 4 | 4 | 4 | 4 | 4 | 4 | 4 | 4 | 4 | 4 | 4 | 4 | 4 |
| 5 | 4 | 4 | 4 | 4 | 4 | 4 | 4 | 4 | 4 | 4 | 4 | 4 | 4 | 4 | 4 | 4 |
| 6 | 4 | 4 | 4 | 4 | 4 | 4 | 4 | 4 | 4 | 4 | 4 | 4 | 4 | 4 | 4 | 4 |
| 7 | 4 | 4 | 4 | 4 | 4 | 4 | 4 | 4 | 4 | 4 | 4 | 4 | 4 | 4 | 4 | 4 |
| 8 | 0 | 0 | 0 | F | 0 | F | F | 0 | 0 | F | F | 0 | F | 0 | 0 | 0 |
| 9 | 0 | F | F | 0 | F | 0 | 0 | 0 | F | 0 | 0 | 0 | 0 | 0 | 0 | 0 |
| A | 0 | 7 | 7 | 0 | 7 | 0 | 0 | 0 | 7 | 0 | 0 | 0 | 0 | 0 | 0 | 0 |
| B | 7 | 0 | 0 | 0 | 0 | 0 | 0 | 0 | 0 | 0 | 0 | 0 | 0 | 0 | 0 | 0 |
| C | 4 | 4 | 4 | 4 | 4 | 4 | 4 | 4 | 4 | 4 | 4 | 4 | 4 | 4 | 4 | 4 |
| D | 4 | 4 | 4 | 4 | 4 | 4 | 4 | 4 | 4 | 4 | 4 | 4 | 4 | 4 | 4 | 4 |

TABLE IIIa-continued

| FIRST DIGIT OF ROM ADDRESS | SECOND DIGIT OR ROM ADDRESS | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| E | 4 | 4 | 4 | 4 | 4 | 4 | 4 | 4 | 4 | 4 | 4 | 4 | 4 | 4 | 4 | 4 |
| F | 4 | 4 | 4 | 4 | 4 | 4 | 4 | 4 | 4 | 4 | 4 | 4 | 4 | 4 | 4 | 4 |

TABLE IIIb

| FIRST DIGIT OF ROM ADDRESS | SECOND DIGIT OR ROM ADDRESS | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| 0 | 0 | 0 | 0 | E | 0 | 0 | 5 | 0 | 0 | C | 6 | 0 | 0 | 0 | 0 | 0 |
| 1 | 0 | B | 8 | 0 | 9 | 0 | 0 | 0 | 2 | 0 | 0 | 0 | 0 | 0 | 0 | 0 |
| 2 | 0 | A | 1 | 0 | 4 | 0 | 0 | 0 | 3 | 0 | 0 | 0 | 0 | 0 | 0 | 0 |
| 3 | 7 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 2 | 0 | 0 | 0 | 0 | 0 | 0 | 0 | 0 |
| 8 | 0 | 0 | 0 | 7 | 0 | 3 | 2 | 0 | 0 | 4 | 9 | 0 | 0 | 0 | 0 | 0 |
| 9 | 0 | 1 | 8 | 0 | 6 | 0 | 0 | 0 | 5 | 0 | 0 | 0 | 0 | 0 | 0 | 0 |
| A | 0 | A | 8 | 0 | C | 0 | 0 | 0 | 0 | 0 | 0 | 0 | 0 | 0 | 0 | 0 |
| B | E | 0 | 0 | 0 | 0 | 0 | 0 | 0 | 0 | 0 | 0 | 0 | 0 | 0 | 0 | 0 |
| C | 0 | 0 | 0 | 0 | 0 | 0 | 0 | 0 | 0 | 0 | 0 | 0 | 0 | 0 | 0 | 0 |
| D | 0 | 0 | 0 | 0 | 0 | 0 | 0 | 0 | 0 | 0 | 0 | 0 | 0 | 0 | 0 | 0 |
| E | 0 | 0 | 0 | 0 | 0 | 0 | 0 | 0 | 0 | 0 | 0 | 0 | 0 | 0 | 0 | 0 |
| F | 0 | 0 | 0 | 0 | 0 | 0 | 0 | 0 | 0 | 0 | 0 | 0 | 0 | 0 | 0 | 0 |

In operation, when a positive going pulse is received on channel 25, counter 530 is enabled to count from decimal zero, and counter 534 is enabled to count from minus decimal 15 toward a decimal zero value. Upon the occurrence of a next leading edge signal on channel 25, the contents of counter 530 are loaded into buffer register 531, and the contents of buffer register 531 are loaded into buffer register 532. In addition, the contents of counter 535 are loaded into buffer register 533, and counters 530 and 534 are restarted. Upon the occurrence of a signal pulse on channel 26, counter 535 counts from decimal 15 and counter 536 counts from decimal zero . Upon the occurrence of a next signal on channel 26, the contents of counter 536 are loaded into buffer register 537, and the contents of counter 534 are loaded into buffer register 538.

Correlator filter controller 423 receives the leading and trailing edge signals on lines 25 and 26, respectively, and the character window signal output by window logic unit 421 of FIG. 10. Controller 423 indicates the occurrence of either intercharacter or intracharacter spaces by issuing a two bit code to line 425 leading to shift registers 426 and 427. Controller 423 also selects multiplexer 429 to one of inputs IN-I5 depending upon the detection of missing edges, missing character strokes and other character image information. Controller 423 further indicates the occurrence of a trailing edge of a character window to controller 432 to initiate a character decision process.

Under normal operating conditions where there are no missing leading or trailing edges of character strokes comprising a character image, the output of buffer register 531 is used to provide a leading edge to leading edge count and the output of buffer register 537 is used to provide a trailing edge to trailing edge count. If a single trailing edge of a stroke is missing, multiplexer 429 first selects the output of buffer register 533 and then the output of buffer register 538 under the control of controller 423. If a single leading edge of a character stroke is missing, multiplexer 429 first is selected to the output of buffer register 538, and then to the output of buffer register 533. If two consecutive trailing edges are missing, multiplexer 429 is selected to the output of buffer register 532. If two consecutive leading edges are missing, then multiplexer 429 is selected to the output of buffer register 537.

A leading edge output of multiplexer 429 is applied to an input of shift register 426 and to an input of shift register 427. The trailing edge output of multiplexer 429 is applied to a second input of shift register 426 and to a second input of shift register 427. In addition, a two bit interval data word from controller 423 is applied to third inputs of shift registers 426 and 427. The leading edge and trailing edge information of the selected inputs to multiplexer 539 are applied to the inputs of two-to-one multiplexer 540. Data status bit information at the D2 output, however, is applied to control line 541 leading to controller 432.

Decision controller 432 enables error correction and decision unit 437 and applies select control signals to the select inputs of multiplexers 539 and 540. The interval data output of multiplexer 540 is applied to ROM 544, accumulator 545 and mismatch accumulator unit 546. When the indicated time interval is not within system specifications, an error correction request is issued by ROM 544 to 8 × 2 bit shift register 547. After a delay of eight clock pulses, the error correction request is supplied to ROM 543 and to the final interval decision logic unit 549. When an error correction request is detected by logic unit 549, the output of ROM 543 is selected. If an error correction request is absent, however, the output of shift register 547 is selected to the input of shift register 552. Upon selecting either the I1 or the I2 inputs, logic unit 549 issues a decision complete signal to the DC input of ROM 548.

The interval data on channel 542 is applied to the ROM of mismatch accumulator unit 546. If a missing edge or a missing character stroke is detected, then the mismatch values issued by the ROM are accumulated in an accumulator of unit 546, and the accumulated output is supplied to ROM 548 to control the character decision process.

The interval data words received from multiplexer 540 are summed by character width accumulator 545, such sum reflecting all of the time intervals within a character width. The output of accumulator 545 is connected to the input of character width decision ROM 550. If the character width information received from accumulator 545 is not within a specified range, ROM 550 issues a reject signal to decision ROM 548. If the character width information is within the specified range, however, the decision ROM 550 issues an error correction enable code on a control line 551 leading to the input of the final interval logic unit 549. Logic unit 549 continually senses the error correction request input, and upon detecting an error correction request selects the output of ROM 543 as before described. The ROM 543 output is not passed through to decision shift register 552, however, until an error correction enable code is detected on line 551. Logic unit 549 also supplies the clock signal received from the system clock unit 558 to the clock input of shift register 552 to control the loading of the interval data into the shift register. In the scanning of a complete character, shift register 552 will include binary codes representative of six intracharacter intervals, a leading intercharacter space and a trailing intercharacter space. The binary codes are transferred in parallel to a decision buffer register 554 under the control of a clock signal generated by logic unit 549 on a control line 555. The clock signal on line 555 is comprised of one pulse for each eight pulses on control line 553.

When the leading edge interval data output of multiplexer 539 has been processed, then the trailing edge interval data output of the multiplexer is selected by multiplexer 540. A second character code then is stored in the decision buffer register 554. Based upon the accumulated mismatch information stored in accumulator 546, ROM 548 selects multiplexer 556 to either the leading edge decision code or the trailing edge decision code outputs of buffer register 554. The output of multiplexer 556 then is supplied to an EBCIDC coding ROM 557, which issues a coded character decision by way of channel 27a to storage buffer 28 of FIG. 10.

The process of forming character decisions from the leading edge information and the trailing edge information, selecting one of two decisions, forming an EBCIDC code from a selected decision takes 64 microseconds. Each such 64 microsecond period is initiated when channel 431 transitions to a logic one level after a next character image is loaded into one of registers 426 and 427. The leading edge interval data is processed within a first sixteen clock signals or 32 microseconds. During the first eight of the sixteen clock signals, time interval data is processed by ROM 544, accumulator 545 and mismatch accumulator unit 546. During the second eight clock signals, the data is processed through the ROM 543 and the logic unit 549, and shifted into shift register 552. During the next sixteen clock signals, the trailing edge information is processed in a like manner.

FIG. 14

Figure 14:
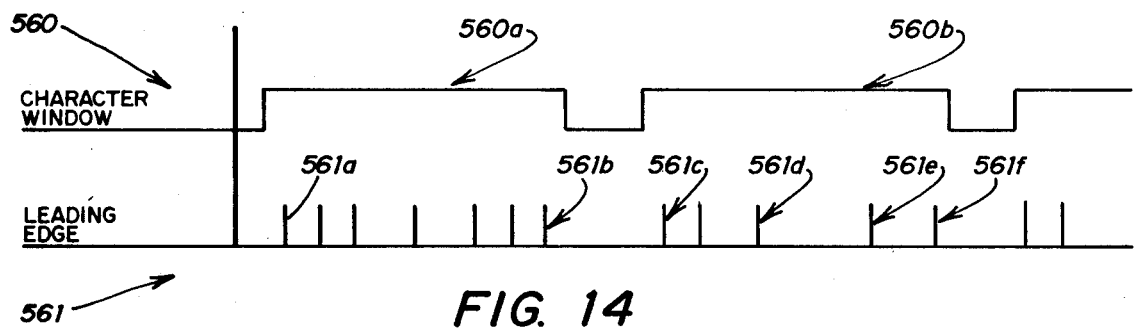
FIG. 14 illustrates a character window waveform, and a leading edge waveform synchronized with the character window waveform.

FIG. 14 illustrates a character window waveform and a leading edge waveform for two characters occurring in an information field.

Waveform 560 illustrated two adjacent character windows, 560a and 560b, within which two magnetic ink characters appear on a document surface. Waveform 561 illustrates the leading edge pulses indicating the occurrence of character strokes comprising the two characters. The character of window 560a is comprised of seven character strokes, while the character of window 560b is comprised of only five character strokes. The character appearing in window 560b, therefore, has two missing edges. Leading edge pulses 561a and 561b are 219 microseconds apart, and pulses 561c and 561d are 100 microseconds apart. Further, leading edge pulses 561e and 561f are 90 microseconds apart, and pulse 561g is delayed 220 microseconds from pulse 561c.

In the preferred embodiment described herein, a character window is approximately 250 microseconds wide, and a character stroke is approximately 15 microseconds wide. A CMC7 character comprised of seven character strokes and six intracharacter intervals is approximately 220 microseconds wide. The processing of the leading edge waveform 561 may be understood with reference to TABLE IV.

TABLE IV

| SHIFT REGISTER 426 | | | | CMC7 Character | Output Bits | EBECIDC Code |
|---|---|---|---|---|---|---|
| Address | DSB | ID | ID Decision | | | |
| 0 | 0 1 | 255 | LIS | | 1 | |
| 1 | 1 1 | 30 | 0 | | 1 | |
| | | | | | | F |
| 2 | 1 1 | 30 | 0 | | 1 | |
| 3 | 1 1 | 52 | 1 | 0 | 1 | |
| 4 | 1 1 | 48 | 1 | | 0 | |
| 5 | 1 1 | 31 | 0 | | 0 | |
| | | | | | | 0 |
| 6 | 1 1 | 29 | 0 | | 0 | |
| 7 | 1 0 | 100 | TIS | | 0 | |
| SHIFT REGISTER 427 | | | | | | |
| Address | DSB | ID | ID Decision | | | |
| 0 | 0 1 | 100 | LIS | | | |
| 1 | 1 1 | 29 | 0 | | 0 | |
| 2 | 1 1 | 51 | 1 | Special | 1 | |
| 3 | 1 1 | 90 | | | 1 | 7 |
| 4 | 1 1 | 50 | 1 | B | 1 | |
| 5 | 1 0 | 80 | TIS | | 1 | |
| 6 | 0 0 | — | — | | 0 | |
| 7 | 0 0 | — | — | | 1 | B |
| | | | | | 1 | |

As may be seen by inspection of TABLE IV, where the contents of shift registers 426 and 427 of FIG. 13 are tabulated, address zero of each register has stored therein a logic zero, one data status bit code and an interval data word indicative of the character space preceding the characters within windows 560a and 560b.

For purposes of illustration, a CMC7 numeric zero occurs in window 560a, and data representative of the numeral is stored in shift register 426. Further, CMC7 special character B occurs in window 560b, and data related to the character is stored in shift register 427.

The ID word at address zero of register 426 further indicates that the numeral zero is the first character occurring in the information field, and therefore represents a full count of an eight bit counter. Further, the data status bit logic code 01 indicates that the 255 microsecond intercharacter space is a leading intercharacter space with respect to the numeral zero. The data status bit codes of addresses one through six indicate intracharacter spaces, and address seven indicates a 100 microsecond trailing intercharacter space. The output of the final interval decision logic unit 549 is represented under the ID decision column, which shows an interval data word sequence corresponding to a CMC7 numeric zero. The numeral zero upon being converted to an EBCIDC code is represented by the code F0.

The address three of register 427 reflects the operation of the missing bar correction ROM 543 in detecting missing edges. ROM 543 provides an additional two time intervals of logic level zero to provide six intracharacter spaces for a CMC7 character. The ID decision column shows an ID word sequence representing a CMC7 special character B. Upon coding such character, the EBCIDC code 7B is formed.

FIG. 15

Figure 15:
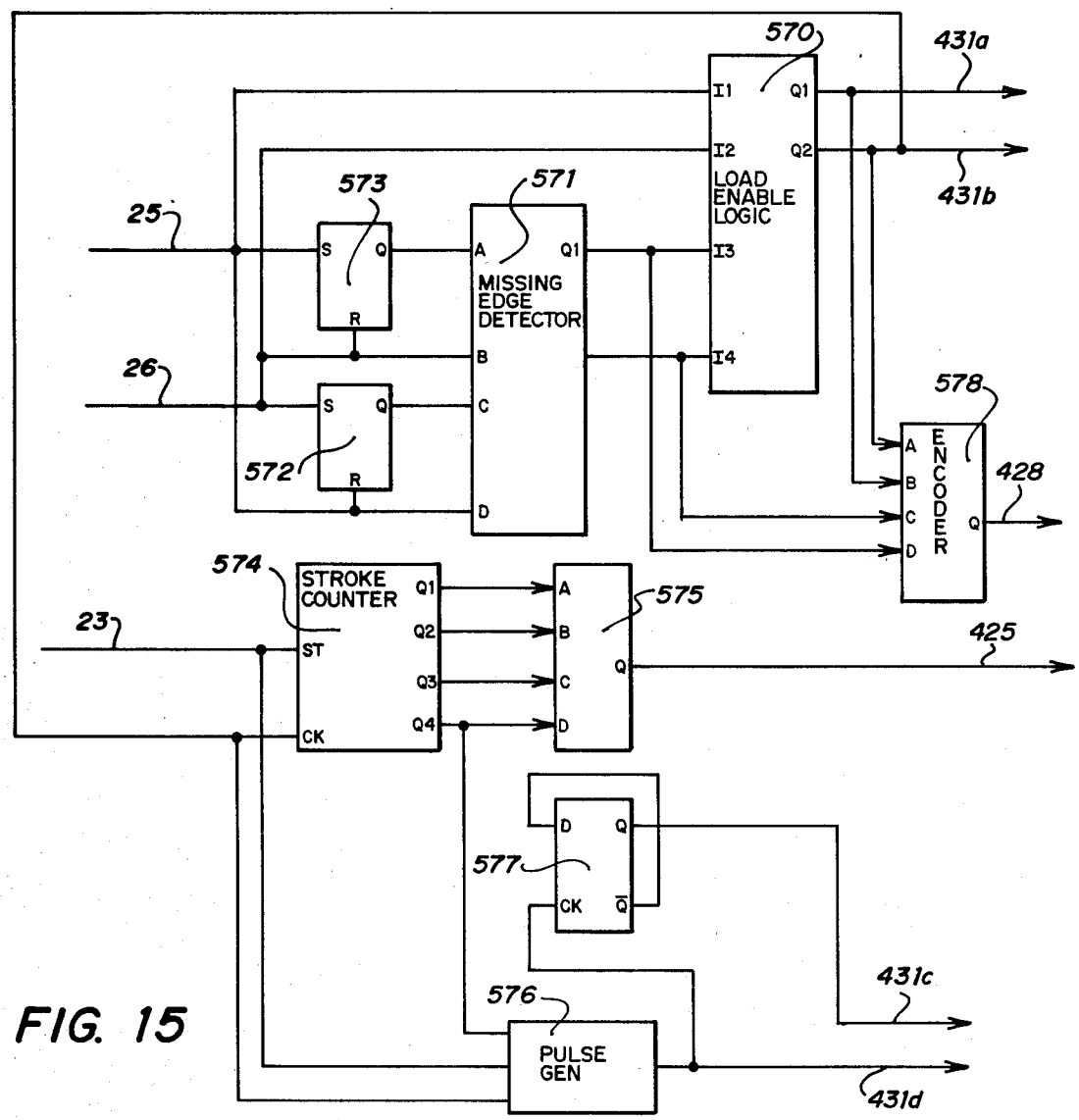
FIG. 15 is a functional block diagram of the corrrelator filter controller of FIG. 10.

FIG. 15 is a functional block diagram of the correlator filter controller 423 of FIG. 10.

Leading and trailing edge signals are applied to data channels 25 and 26, respectively, which lead to the I1 and I2 inputs, respectively, of a load enable logic unit 570. Channel 25 also is connected to the D input of a missing edge detector 571, to the reset input of a flip-flop 572 and to the set input of a flip-flop 573. Channel 26 further is connected to the set input of flip-flop 572, to the reset input of flip-flop 573, to the B input of detector 571 and to the I2 input of load enable logic unit 570.

A character window pulse on data channel 23 is applied to the start input of a four bit stroke counter 574. The Q1-Q4 outputs of counter 574 are applied to the A-D inputs of an encoder 575, the Q output of which is applied to channel 425 leading to the I2 inputs of shift registers 426 and 427 of FIG. 13. The Q4 output of counter 574 also is applied to the ST1 (Start 1) input of a pulse generator 576.

The ST2 input of pulse generator 576 is connected to the clock input of counter 574 and to the Q2 output of logic unit 570. The enable input of generator 576 is connected to channel 23, and to the start input of counter 574. The output of generator 576 is connected to the clock input of a flip-flop 577 and to a data line 431d of data channel 431. The Q output of flip-flop 577 is connected to the D input of the flip-flop, and the Q output is connected to data line 431c of data channel 431.

The Q output of flip-flop 573 is connected to A input of detector 571, and the Q output of flip-flop 572 is connected to the C input of the detector. The Q1 output of detector 571 is connected to the I3 input of logic unit 570, and to the D input of an encoder 578. The Q2 output of detector 571 is connected to I4 input of logic unit 570 and to the C input of encoder 578. The Q output of encoder 578 is connected to control channel 428 leading to the select input of multiplexer 429 of FIG. 13.

The Q1 output of logic unit 570 also is connected to data line 431a and to the B input of encoder 578. The Q2 output of logic unit 570 is connected to data line 431b, and to the A input of encoder 578.

In operation, stroke counter 574 is initialized by the leading edge of a character window pulse appearing on line 23. Thereafter, the counter counts the number of bars or character strokes that occur as defined by a leading edge pulse on channel 25 followed by a trailing edge pulse on channel 26. Where a trailing edge is missing, however, a bar will be counted when two successive leading edge pulses occur. Further, where a leading edge pulse is missing, a bar is counted when two trailing edge pulses consecutively occur. When channel 23 at the start input of counter 574 is low, the encoder output is a logic 01 to indicate a preceding intercharacter space. When the character window signal transitions to a logic one level, the encoder 575 continues to supply a logic 01 code until a first character stroke is detected as indicated by a leading or trailing edge signal on channels 25 or 26, respectively. Thereafter, the encoder output is a logic 11 to indicate intracharacter spaces until one of two conditions occurs. Upon the trailing edge of a character window pulse being detected by detector 571, or upon a count seven being indicated at the Q1-Q3 outputs of counter 574, the output of encoder 575 becomes a logic 10 to indicate a trailing intercharacter space. Thus, the count eight decode provides a safety feature to accept no more than seven character strokes within a character window. Additional character strokes may be caused by ink splatter or overprint conditions.

The Q4 output of counter 574 also is applied to pulse generator 576 to clock flip-flop 577, and to indicate on line 431d that a character decision is requested. Pulse generator 576 is enabled by a low to high transition on data channel 23 indicating the occurrence of a character window. Thereafter, the pulse generator issues a single pulse on line 431d when both the Q2 output of enable logic unit 570 and the Q4 output of stroke counter 574 are in logic one states. Flip-flop 577 is clocked thereby to control the selection of shift registers 426 and 427 by multiplexer 539 of FIG. 13. If no pulse is sensed either at the ST1 or the ST2 inputs within 255 microseconds after a low to high condition occurs on data channel 23, a pulse is issued on data line 431d to indicate a time out condition wherein no following character windows are detected.

Flip-flops 572 and 573 are alternately set and reset by the occurrence of leading and trailing edge signals on channels 25 and 26, respectively. The flip-flop outputs and the channels 25 and 26 are sensed by missing edge detector 571 to detect either a missing leading edge or a missing trailing edge. If a missing leading edge is detected by the occurrence of two consecutive trailing edges, the Q1 output of detector 571 transitions to a logic one which is applied to logic unit 570 and encoder 578. If two leading edges occur without an intermediate trailing edge, a missing trailing edge is indicated by a logic one state at the Q2 Q2 output of detector 571 which also is applied to logic unit 570 and encoder 578.

Load enable logic unit 570 senses the Q1 and Q2 outputs of detector 571, and channels 25 and 26. If no leading or trailing edges are missing, the signals on channels 25 and 26 are passed through unit 570 to the Q1 and Q2 outputs, respectively. If leading or trailing edge pulses are missing, however, logic unit 570 supplies pulses to correct for the missing edge pulses. Thus, the logic unit 570 operates to supply leading edge or trailing edge pulses to line 431a and 431b. The Q1 and Q2 outputs of unit 570 are applied to the decision controller 432, which generates clock signals therefrom to operate the shift registers 426 and 427.

FIGURE 16

Figure 16:
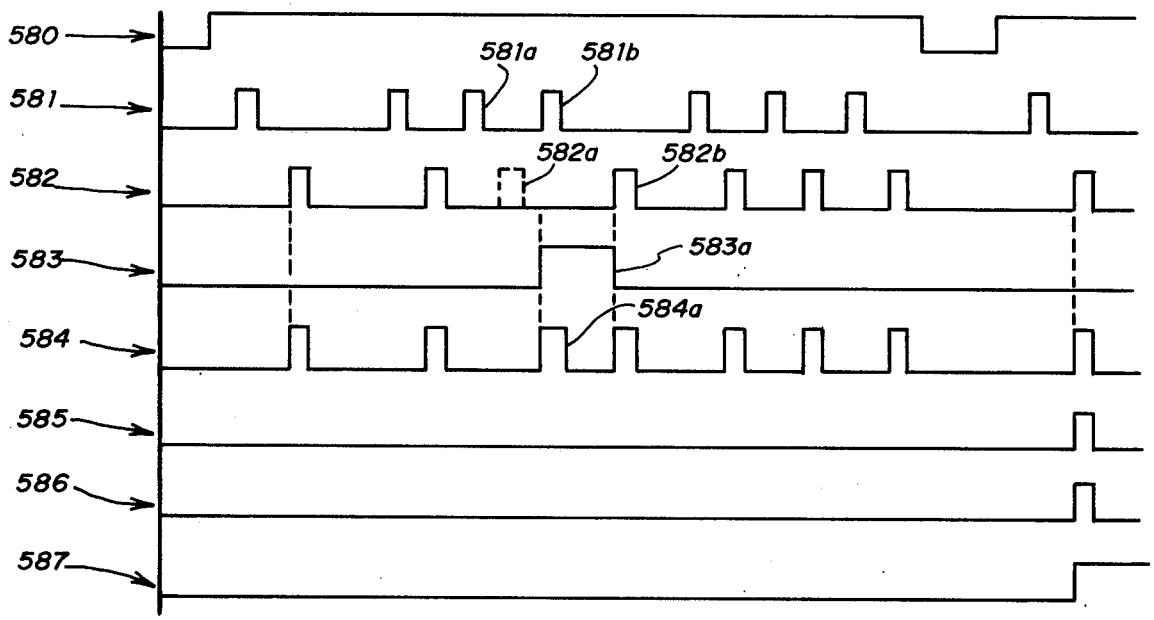
FIG. 16 is a timing and output waveform diagram of the operation of the correlator filter controller of FIG. 15.

FIG. 16 is a timing and output waveform diagram illustrating the operation of the system of FIG. 15.

Waveform 580 illustrates a character window signal on channel 23 which is applied to the start input of counter 574. Waveform 581 illustrates leading edge signals carried by channel 25, and waveform 582 illustrates trailing edge signals carried by channel 26. Waveform 582 has a missing trailing edge as indicated by dotted lines generally referred to by reference number 582a. Waveform 583 illustrates a missing trailing edge signal at the Q2 output of detector 571 in response to waveforms 581 and 582. A pulse 583a is generated in response to the detection of two leading edge pulses 581a and 581b of waveform 581 without detecting an intermediate trailing edge pulse in waveform 582. Pulse 583a has a leading edge occurring at the leading edge of pulse 581b and a trailing edge occurring at the leading edge of the next following trailing edge pulse 582b.

Waveform 584 illustrates the Q1 output of load enable logic unit 570 in response to waveforms 580–583, wherein a pulse 584a is added to the trailing edge signal applied to data line 431b. Waveform 585 illustrates the Q4 output of counter 574 wherein a pulse is generated upon the occurrence of eight leading edge or eight trailing edge pulses after the leading edge of a character window is sensed. Waveform 586 illustrates the decision request signal applied by pulse generator 576 to data line 431d. Waveform 587 illustrates the Q output of flip-flop 577 which is applied to data line 431c.

FIGURE 17

Figure 17:
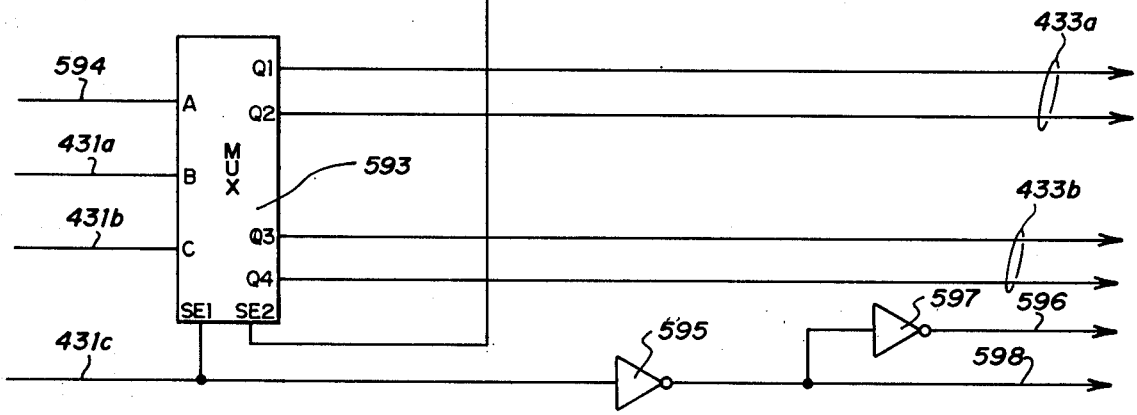
FIG. 17 is a functional block diagram of the decision controller of FIG. 13.

FIG. 17 is a functional block diagram of the decision controller 432 of FIG. 13.

The data status bit output D2 of multiplexer 539 is applied to channel 541 leading to the A and B inputs of a decoder 590, where binary coded words on channel 541 are decoded. A data enable signal is supplied at the Q1 output of decoder 590, a leading intercharacter space signal is supplied at the Q2 output and a trailing intercharacter space signal is supplied at the Q3 ouutput. The Q1 output of decoder 590 is connected to a control line 551a of control channel 551, and the Q2 output is connected to the A input of an encoder 591. The Q3 output of decoder 590 is connected to B input of encoder 591.

The Q1 output of encoder 591 is applied to a control line 551b of control channel 551, and the Q2 output is connected to control line 435b. The Q3 output of encoder 591 is connected to the reset input of a flip-flop 592, the set input of which is connected to control line 431d of control channel 431. The Q output of flip-flop 592 is connected to the C input of encoder 591 and to the SEL2 input of a multiplexer 593.

The A input of multiplexer 593 is connected by way of a control line 594 to the 500 KHz output of system clock unit 588 of FIG. 13. The B input of multiplexer 593 is connected to a control line 431a and the C input is connected to a control line 431b of control channel 431. The SEL1 input to multiplexer 593 is connected to control line 431c of channel 431 leading to an output of correlator filter controller 423, and through an inverter 595 to a control channel 596 leading to a recirculation enable input of register 426. The output of inverter 595 also is connected through an inverter 597 to a recirculation enable input of register 427, and to a control line 598 leading to the select input of multiplexer 539 of FIG. 13. The Q1 and Q2 outputs of multiplexer 593 are connected to control lines 433a leading to the clock input of shift register 427, and the Q3 and Q4 outputs of multiplexer 593 are connected to control lines 433b leading to the clock input of shift register 426.

In operation, the system of FIG. 17 controls the logic decision process of the error detection and decision unit 437 of of FIG. 10. Upon receiving a decision request signal from correlator filter controller 423 on line 431d, flip-flop 592 is set and the Q output of the flip-flop transitions to a logic one state. If the SEL1 input to multiplexer 593 is at a logic zero state when the SEL2 input is at a logic one state, the 500 KHz clock on line 594 is applied to the Q1 and Q2 outputs of multiplexer 593, and the signals on lines 431a and 431b are applied to the Q3 and Q4 outputs, respectively. If the SEL1 input is at a logic one level during the period that the SEL2 input is at a logic one level, the 500 KHz clock on line 594 is applied to the Q3 and Q4 outputs. The signals on lines 431a and 431b, however, are applied to the Q1 and Q2 outputs, respectively. If the SEL1 input is in a logic zero, the 500 KHz clock signal on line 594 is blocked. The signals on lines 431a and 431b, however, are applied to the Q3 and Q4 outputs, respectively. Lines 433a carry the clock signal for the shift register 427 of FIG. 13, and lines 433b carry the clock signal for shift register 426.

Decoder 590 receives binary coded interval data words on channel 541 at the A and B inputs, and provides an enable data signal at the Q1 output to control the character decision process as illustrated in FIG. 13. In addition, a leading intercharacter space signal is provided at the Q2 output, and a trailing intercharacter space signal is provided at the Q3 output.

Encoder 591 is activated when the C input of the encoder transitions to logic one level. The encoder senses the Q2 and Q3 outputs of decoder 590, and the Q output of flip-flop 592 to provide an error detection enable signal on line 551b to enable the error detection process during which missing character strokes are detected. In addition, a trailing edge select signal is provided at the Q2 output of encoder 591 to control multiplexer 540, and a reset signal is provided at the Q3 output to reset flip-flop 592. When the C input of encoder 591 transitions from a logic zero to a logic one, the Q1 output transitions to a logic one no matter the logic state of the A and B inputs. When the B input of encoder 591 transitions from a logic zero to a logic one, the Q1 output is reset to a logic zero level. Upon the occurrence of a trailing edge on a second occurring pulse at the B input of the encoder, the Q2 output of the encoder transitions to a logic one level. Further, when the Q2 output of encoder 591 transitions from a logic zero to a logic one level, the Q1 output transitions to a logic one level. In addition, a third occurring pulse at the A input of the encoder resets the Q1 output. Still further, a logic one pulse appears at the Q3 output of encoder 591 upon the occurrence of the trailing edge of the fourth occurring pulse at the B input of the encoder.

FIG. 18

Figure 18:
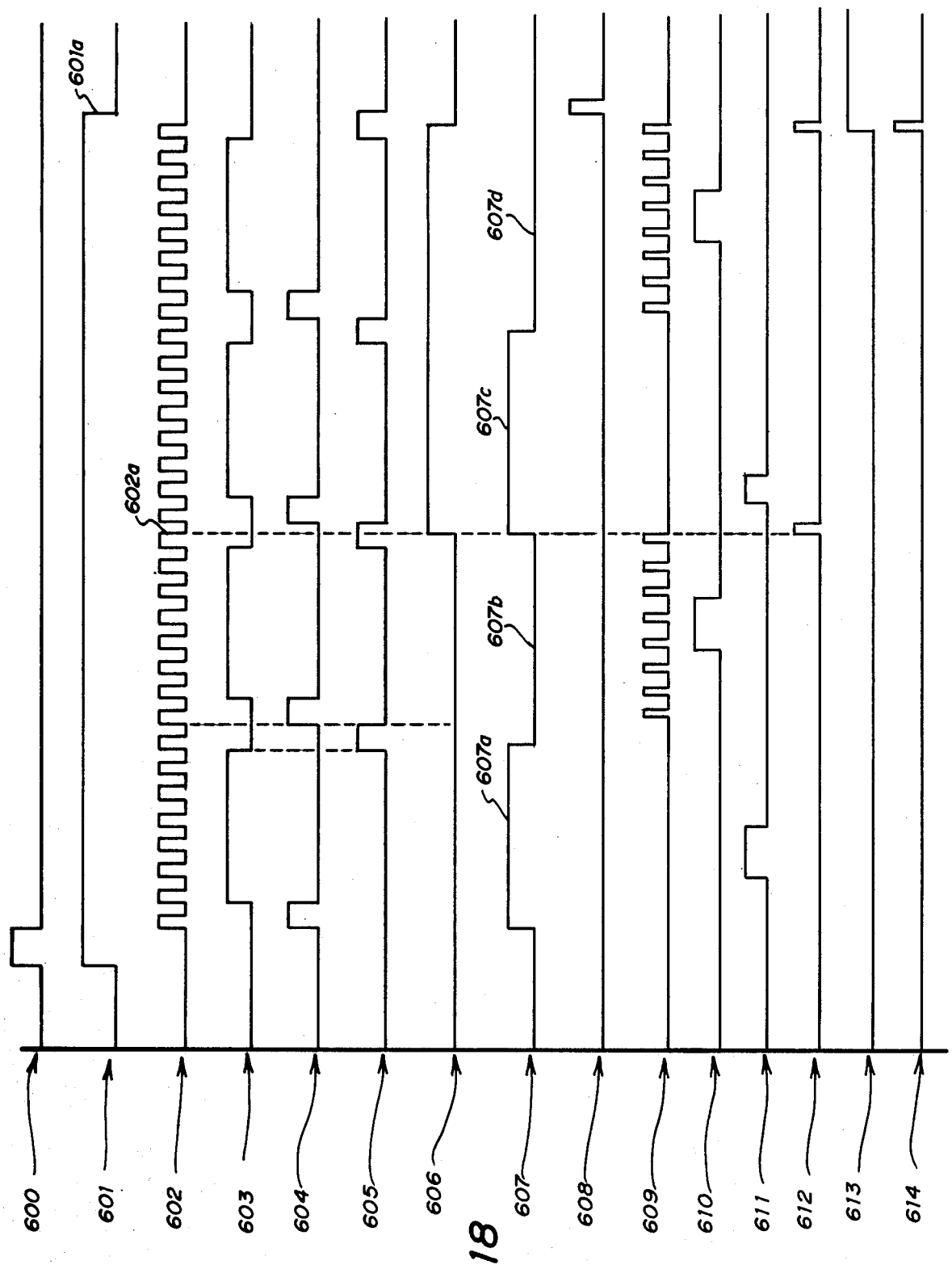
FIG. 18 is a timing and output waveform diagram of the operation of the system of FIGS. 13a and 13b.

FIG. 18 is a timing and output waveform diagram of the operation of the system of FIG. 13.

Waveform 600 illustrates a decision request pulse occurring on line 431d of FIG. 17. The output of flip-flop 592 in response to waveform 600 is illustrated by waveform 601. The pulse 601a of waveform 601 selects the 500 KHz clock illustrated by waveform 602 to the Q1 and Q2 outputs of the multiplexer 593. As before described, the selection code at the SEL1 and SEL2 inputs of multiplexer 593 may also select the clock signal to the Q3 and Q4 outputs of the multiplexer.

Waveform 603 illustrates a waveform occurring at the Q1 output of decoder 590, and waveform 604 illustrates a waveform occurring at the Q2 output. In addition, waveform 605 illustrates a waveform occurring at the Q3 output of decoder 590.

Waveforms 606 and 607 are illustrative of the Q2 and Q1 outputs of encoder 591, respectively. Waveform 608 illustrates the Q3 output of encoder 591 supplied to the reset input of flip-flop 592.

Referring to FIG. 13, waveform 609 illustrates the clock signal appearing on line 553 at the output of the final interval decision logic unit 549. Further, waveform 610 illustrates the final interval data signal supplied to the data input of the eight bit shift register 552. Waveform 611 illustrates the error correction request signal generated by the error detection ROM 544 of FIG. 13. Waveform 612 illustrates the clock signal on line 555 leading from the final interval decision logic unit 549 to the decision buffer register 554. Waveform 613 illustrates the decision selection signal provided at the D1 output of ROM 548. Waveform 614 illustrates an output ready pulse which is generated by decision controller 432 and supplied to succeeding systems upon the occurrence of a trailing edge of a second occurring pulse of waveform 612.

The first 16 pulses of waveform 602 define the period during which leading edge information is processed by the reading system described herein, and the second 16 pulses define the period during which the trailing edge information is processed. The 64 microsecond period defined by the 32 pulses of waveform 602 is divided into four time periods of 16 pulses each as defined by time intervals 607a–607d of waveform 607. During time intervals 607a and 607c, an error detection process occurs wherein missing character strokes are detected. During time intervals 607b and 607d, the final decision process occurs.

During the time period defined by 16 pulses of waveform 602, interval data words output by multiplexer 540 of FIG. 13 are processed twice, once during the error detection process in which missing bars of a character image are detected, and once during the final decision process during which a character code is formed. Waveform 610 represents the sequence of logic zero and logic one levels indicated by the interval data words processed during 16 clock pulses of waveform 602. More particularly, if an interval data word represents an intracharacter space of 24 to 36 microseconds, a logic zero is indicated in waveform 610. If the interval data word indicates an intracharacter space 44 to 56 microseconds in width, a logic one is indicated. The sequence of logic zero and logic one levels illustrated by waveform 610 identifies a numeral zero in the CMC7 font.

It further may be seen by inspection of waveforms 602, 605 and 606 that waveform 606 transitions from a logic zero to a logic one upon the occurrence of the trailing edge of the pulse 602a of waveform 602. Thus, the first sixteen pulses of waveform 602 and the second 16 pulses occurring in the waveform are divided into leading edge and trailing edge processing periods by waveform 606.

Waveform 609 further illustrates the shift register clock signals comprising eight pulse bursts which occur during the second half of both the leading and trailing edge time periods. During the occurrence of an eight pulse burst, the data of waveform 610 is transferred into the shift registers 426 and 427.

Having described the invention in connection with certain specific embodiments thereof, it is to be understood that further modifications may now suggest themselves to those skilled in the art and it is intended to cover such modifications as fall within the scope of the appended claims.

What is claimed is:

1. A character recognition system for reading bar-space encoded characters printed in magnetic ink on a document surface as it passes a reading station, which comprises:

a. magnetic sensing means for scanning a character and forming bipolar sensor responses indicative of the passage of leading and trailing edges of magnetic material on said surface;

b. analog processor means in electrical communication with said magnetic sensing means for forming normalized leading edge and trailing edge waveforms from said bipolar sensor responses;

c. edge detecting and digitizing means for detecting a character stroke from said leading edge and said trailing edge waveforms and for producing leading edge and trailing edge digital signals;

d. deskew logic means receiving said leading edge and trailing edge digital signals from said edge detecting means for merging duplicate edge signals caused by any oblique scanning of said character;

e. means in electrical communication with said deskew logic means for detecting and repairing missing character stroke edges and missing character strokes from said leading edge and said trailing edge digital signals; and f. character recognition means receiving corrected leading and trailing edge digital signals from said error correction means for identifying said character.

2. The combination set forth in claim 1, wherein said analog processor means includes:

a. Bessel filter means in electrical communication with said magnetic sensing means for eliminating high frequency noise;

b. absolute value amplifier means in electrical communication with said Bessel filter means for amplifying said bipolar sensor responses and forming therefrom leading and trailing edge signals;

c. first adder means in electrical communication with said absolute value amplifier means for summing said leading edge signals to form a composite leading edge waveform;

d. second adder means in electrical communication with said absolute value amplifier means for summing said trailing edge signals to form a composite trailing edge waveform; and e. normalizing means operating upon said composite leading edge waveform and said composite trailing edge waveform for providing said leading and said trailing edge waveforms.

3. The combination set forth in claim 1, wherein said edge detecting means includes:

a. peak detection means responsive to said analog processor means for accurately indicating the occurrence of a waveform peak in said leading edge and said trailing edge waveforms;

b. level detection means responsive to said analog processor means for forming a reference pulse width;

c. comparator means responsive to said analog processor means for digitizing said leading edge and said trailing edge waveforms; and d. pulse width discriminator means in electrical communication with said peak detection means, said level detection means and said comparator means for eliminating pulses from said comparator means having a width less than said reference pulse width.

4. The combination set forth in claim 3, wherein said deskew logic means includes:

a. delay means in electrical communication with said pulse width discriminator means for imparting a delay to said leading edge and said trailing edge digital signals equivalent to a time period within which said duplicate edge signals may occur;

b. counter means in electrical communication with said pulse width discriminator means for counting the time interval between said duplicate edge signals;

c. shift register means in electrical communication with said delay means for providing additional increments of delay to be applied to a first of said duplicate edge signals;

d. multiplexer means receiving the outputs of said shift register means for selecting one of said increments of delay;

e. division means responsive to said counter means for controlling the operation of said multiplexer means; and f. reset logic means responsive to the output of said multiplexer means for eliminating a second of said duplicate edge signals from said leading edge and said trailing edge digital signals.

5. A magnetic ink character recognition system for reading bar encoded characters, which comprises:

a. magnetic sensing means for scanning a character to form bipolar sensor responses;

b. analog processor means in electrical communication with said magnetic sensing means for forming normalized leading and trailing edge waveforms from said sensor responses;

c. edge detecting means receiving said leading and said trailing edge waveforms for detecting a character stroke signal;

d. deskew logic means receiving digitized leading edge and trailing edge character stroke signals from said edge detecting means for merging adjacent pulses occurring in a time period less than the time separation of two consecutive leading edges or two consecutive trailing edges of said character;

e. horizontal location logic means in electrical communication with said deskew logic means for signaling the presence of said character;

f. error correction means responsive to said horizontal location logic means for repairing missing character stroke edges and missing character strokes in said leading edge and said trailing edge character stroke signals;

g. recognition means in electrical communication with said error correction means for identifying said character from corrected leading and trailing edge character stroke signals;

h. pattern simulator means responsive to external stimuli for providing known character pattern waveforms; and i. input selector means responsive to said pattern simulator means for routing said bipolar sensor responses and said character pattern waveforms to said analog processor means.

6. The combination set forth in claim 5, wherein said pattern simulator means includes:

a. mode selection decoding means responsive to a first of said external stimuli for controlling the operation of said input selector means;

b. starting character decoding means responsive to a second of said external stimuli for identifying the mode of operation of said pattern simulator means;

c. simulator control means responsive to said mode selection decoding means and said starting character decoding means for identifying selected ones of said character pattern waveforms;

d. character pattern generator means responsive to said simulator control means for generating said selected ones; and e. control means in electrical communication with said character pattern generator means for amplifying and applying said selected ones to said analog processor means.

7. A character recognition system for reading bar encoded characters printed in magnetic ink on a document surface, which comprises:

a. magnetic sensing means for scanning a character and forming bipolar responses indicative of the occurrence of character stroke edges;

b. edge detecting and digitizing means for detecting a character stroke in said leading edge and said trailing edge components of said responses and for converting the same into digitized character stroke signals;

c. deskew logic means receiving digitized leading edge and trailing edge character stroke signals from said edge detecting means for merging duplicate edge signals caused by any oblique scanning of said character;

d. horizontal location logic means in electrical communication with said deskew logic means for signaling the presence of said character;

e. error correction means in electrical communication with said horizontal location logic means for detecting and repairing missing character stroke edges and missing character strokes in said leading edge and said trailing edge character stroke signals; and f. character recognition means receiving corrected leading and trailing edge character stroke signals from said error correction means for identifying said character.

8. The combination set forth in claim 7, wherein said horizontal location logic means includes:

a. first shift register delay means in electrical communication with said deskew logic means for imparting a delay to said leading edge and said trailing edge character stroke signals to synchronize the occurrence of said character with a logic window signal;

b. counter means responsive to said leading and said trailing edge character stroke signals for indicating the presence of said character;

c. logic state detector means responsive to said counter means for indicating a change in logic state of said counter means;

d. second shift register delay means in electrical communication with said logic state detector means for imparting a time delay equivalent to the width of said character;

e. logic gating means in electrical communication with said second shift register delay means and responsive to the complement of the output of said counter means for signaling the occurrence of an intercharacter space; and f. window generating means responsive to said logic gating means for generating said logic window signal during which said character may appear.

9. A character recognition system for reading bar-spaced encoded characters printed in magnetic ink on a document surface as it passes a reading station which comprises:

a. magnetic sensing means for scanning a character and forming bipolar responses indicative of the passage of leading and trailing edges of magnetic material on said surface;

b. edge detecting and digitizing means for detecting a character stroke from leading edge and said trailing edge components of said responses and converting the same into digitized signals;

c. deskew logic means receiving leading edge and trailing edge digital signals from said edge detecting means for merging duplicate edge signals caused by any oblique scanning of said character;

d. horizontal location logic means in electrical communication with said deskew logic means for signaling the presence of said character; and e. character recognition means responsive to said horizontal location logic means and receiving said leading edge and said trailing edge digital signals for identifying said character passing said reading station.

10. In automatic reading of CMC7 characters as coded by variations in spacing between vertical bars of magnetic material, the method which comprises:

a. separately sensing all magnetic materials in each of a multiplicity of side-by-side paths spanning the height of said characters and extending the length of the field on which said characters may appear to produce a like multiplicity of analog signals;

b. summing as a time amplitude function the positive excursions of said signals above a first predetermined amplitude level;

c. summing as a time amplitude function the negative excursions of said signals above a second predetermined amplitude level;

d. generating a first train of pulses, one for each peak in the sum of said positive excursions;

e. generating a second train of pulses, one for each peak in the sum of said negative excursions; and f. producing signals from said first and second trains representative of leading and trailing edges of bars forming said character for identification of each character in dependence upon said spacing.

11. A method of identifying magnetic ink bar-space encoded characters, which comprises:

a. scanning said character to sense changes in magnetic flux as said characters pass a reading station;

b. rectifying magnetic sensor responses generated during the scanning of said character to form a leading edge waveform and a trailing edge waveform;

c. normalizing said leading edge waveform and said trailing edge waveform;

d. signaling the occurrence of a waveform peak in said leading edge and said trailing edge waveforms;

e. detecting the amplitude of said leading edge and said trailing edge waveforms to select a first pulse width or a second pulse width;

f. digitizing said leading edge waveform and said trailing edge waveform to form a leading edge digital signal and a trailing edge digital signal;

g. eliminating pulses in said leading edge digital signal occurring at the time of occurence of a leading edge waveform peak wherever a pulse width is less than said first pulse width;

h. eliminating pulses in said trailing edge digital signal occurring at the time of occurrence of a trailing edge waveform peak wherever a pulse width is less than said second pulse width;

i. merging adjacent pulses in said leading edge digital signal occurring within a time period equivalent to the time separation of two consecutive leading edges of said character;

j. merging adjacent pulses in said trailing edge digital signal occurring within a time period equivalent to the time separation of two consecutive trailing edges of said character;

k. generating leading edge and trailing edge binary interval data code streams indicative of the time separation between character stroke edges passing said reading station; and l. forming a first character decision from said leading edge stream and a second character decision from said trailing edge stream.

12. A character recognition system for reading magnetic ink characters printed in a CMC7 font as they pass a reading station which comprises:

a. magnetic sensor means for scanning an information field printed on a document surface and forming bipolar analog signals in response to character stroke edges passing through registration with said sensor means;

b. analog processing means in electrical communication with said sensor means for conditioning and normalizing said analog signals, and forming therefrom leading edge and trailing edge waveforms;

c. edge detection means in electrical communication with said analog processing means for forming leading edge and trailing edge digital signals accurately indicating the occurrence of a character stroke edge;

d. skew control means receiving said leading edge and said trailing edge digital signals for eliminating duplicate pulses caused by scanning said information field obliquely;

e. logic means in electrical communication with said skew control means for generating a character window waveform and synchronizing the occurrence of said leading edge and said trailing edge digital signals with said character window waveform;

f. edge correction means in electrical communication with said logic means for detecting and correcting for missing character stroke edge signals, and forming leading edge and trailing edge binary coded interval data streams indicative of the time periods between character strokes in said information field;

g. character stroke correction means in electrical communication with said edge correction means for detecting and repairing missing interval data codes in said data streams and forming therefrom leading edge and trailing edge binary signals; and h. character decision means receiving said leading edge and said trailing edge binary signals for identifying said characters.

13. The combination set forth in claim 12, wherein said edge correction means includes:

a. counter means for forming leading edge and trailing edge interval data codes indicating the time interval between character strokes;

b. first multiplexer means in electrical communication with said counter means for routing said leading edge and said trailing edge interval data codes;

c. shift register storage means in electrical communication with said first multiplexer means for storing said leading edge and said trailing edge interval data codes; and d. interval data controller means in electrical communication with said logic means for controlling the loading of said shift register storage means and the operation of said first multiplexer means.

14. The combination set forth in claim 13, wherein said counter means includes:
   a. a first counter preset to a decimal zero to count the time interval between the leading edges of two adjacent character strokes;
   b. a second counter preset to a decimal value equivalent to an average character stroke width to count the time interval between the trailing edge of a first of said two adjacent character strokes and the leading edge of a second of said two adjacent character strokes;
   c. a third counter preset to a decimal zero to count the time interval between the trailing edges of said two adjacent character strokes;
   d. a fourth counter preset to a negative decimal value having a magnitude equivalent to said average character stroke width to count the time interval between the leading edge of said first of said two adjacent character strokes and a next occurring trailing edge;
   e. a first register means in electrical communication with said first counter for storing two consecutive leading edge time interval counts;
   f. a second register means in electrical communication with said second counter for storing time interval counts indicative of a missing leading edge;
   g. a third register means in electrical communication with said third counter for storing trailing edge time interval counts; and
   h. a fourth register means in electrical communication with said fourth counter for storing time interval counts indicative of a missing trailing edge.

15. The combination set forth in claim 13, wherein said character stroke correction means includes:
   a. decision controller means responsive to said interval data controller means for controlling the operation of said character stroke correction means;
   b. second multiplexer means responsive to said decision controller means and in electrical communication with said shift register storage means for routing said leading edge and said trailing edge interval data codes from said shift register storage means;
   c. a first ROM means addressed by said leading edge and said trailing edge interval data codes for indicating the absence of character strokes, and where no missing character strokes are detected for providing binary codes indicative of the logic state to be accorded said leading edge and said trailing edge interval data codes;
   d. buffer register means in electrical communication with said first ROM means for storing the output of said first ROM means;
   e. a second ROM means addressed by said leading edge and said trailing edge interval data codes for supplying said binary codes for said missing interval data codes;
   f. first accumulator means in electrical communication with said second multiplexer means, for summing said leading edge and said trailing edge interval data codes;
   g. a third ROM means addressed by said first accumulator means for verifying character widths;
   h. decision logic means in electrical communication with said second ROM means and said buffer register means and responsive to said third ROM means for supplying said binary codes to said character decision means;
   i. a fourth ROM means addressed by said leading edge and said trailing edge interval data codes for indicating interval data code mismatches;
   j. second accumulator means in electrical communication with said fourth ROM means for summing said mismatches; and
   k. a fifth ROM means addressed by said second accumulator means for comparing leading edge mismatch sums with trailing edge mismatch sums.

* * * * *